(12) United States Patent
Zhu

(10) Patent No.: US 11,438,986 B2
(45) Date of Patent: Sep. 6, 2022

(54) METHODS AND SYSTEMS FOR FEATURE OPERATIONAL MODE CONTROL IN AN ELECTRONIC DEVICE

(71) Applicant: Motorola Mobility LLC, Chicago, IL (US)

(72) Inventor: Xiaofeng Zhu, Nanjing (CN)

(73) Assignee: Motorola Mobility LLC, Chicago, IL (US)

( * ) Notice: Subject to any disclaimer, the term of this patent is extended or adjusted under 35 U.S.C. 154(b) by 60 days.

(21) Appl. No.: 15/931,804

(22) Filed: May 14, 2020

(65) Prior Publication Data

US 2021/0337646 A1 Oct. 28, 2021

(30) Foreign Application Priority Data

Apr. 23, 2020 (CN) .......................... 202010325690.3

(51) Int. Cl.
*H05B 47/115* (2020.01)
*F21V 23/04* (2006.01)
*G06F 3/01* (2006.01)

(52) U.S. Cl.
CPC ........ *H05B 47/115* (2020.01); *F21V 23/0414* (2013.01); *G06F 3/017* (2013.01)

(58) Field of Classification Search
CPC .......................... H05B 47/115; F21V 23/0414
See application file for complete search history.

(56) References Cited

U.S. PATENT DOCUMENTS

| | | | |
|---|---|---|---|
| 9,430,988 B1* | 8/2016 | Hancock | G09G 5/10 |
| 9,715,283 B2* | 7/2017 | Elkins | G06F 1/1694 |
| 10,274,336 B2* | 4/2019 | Piemonte | H04M 1/72454 |
| 10,547,974 B1* | 1/2020 | Pollefeys | G01S 5/0284 |
| 11,149,909 B2* | 10/2021 | Maglica | H02J 7/0045 |
| 2009/0180280 A1* | 7/2009 | Hadden | F21L 4/005 362/208 |
| 2009/0261737 A1* | 10/2009 | Wright | F21L 4/027 315/297 |
| 2011/0037419 A1* | 2/2011 | Hoffman | H05B 47/17 315/313 |

(Continued)

OTHER PUBLICATIONS

"Automatic Lights Using LDR (Brightness Control)", How to Instructions for bulb that automatically adjusts brightness according to brightness of room; Published on or before May 2018; https://www.instructables.com/id/Automatic-Lights-Using-LDR-Brightness-Control/.

"Current USA Single Ramp Timer", Unknown exact availability date but prior to filing of present application; Available on Amazon at https://www.amazon.com/Current-USA-Single-Timer-Aquarium/dp/B00FDV1AFA.

(Continued)

*Primary Examiner* — Seokjin Kim
*Assistant Examiner* — Jianzi Chen
(74) *Attorney, Agent, or Firm* — Philip H. Burrus, IV

(57) ABSTRACT

An electronic device includes one or more sensors, one or more processors operable with the one or more sensors, and a user interface component operable with the one or more processors in at least a first mode of operation and a second mode of operation that is different from the first mode of operation. The one or more processors operate the user interface component in the first mode of operation in response to a first trigger input, and transition operation of the user interface component from the first mode of operation to the second mode of operation upon the one or more sensors detecting a second trigger input occurring while the one or more processors operate the user interface component in the first mode of operation.

20 Claims, 8 Drawing Sheets

(56) References Cited

U.S. PATENT DOCUMENTS

| | | | | |
|---|---|---|---|---|
| 2011/0130697 A1* | 6/2011 | Nagle | ............... | A61N 1/0492 |
| | | | | 602/53 |
| 2011/0261559 A1* | 10/2011 | Couture | ............... | F21L 4/005 |
| | | | | 362/208 |
| 2013/0332113 A1* | 12/2013 | Piemonte | ............ | G01S 19/39 |
| | | | | 702/189 |
| 2015/0074615 A1* | 3/2015 | Han | ............... | G06V 40/1353 |
| | | | | 715/863 |
| 2015/0205946 A1* | 7/2015 | Aurongzeb | ......... | G06F 3/0346 |
| | | | | 726/19 |
| 2020/0166340 A1* | 5/2020 | Hinderling | ............ | F16M 11/18 |

OTHER PUBLICATIONS

"How to increase and decrease the torch brightness", YouTube Video; Uploaded Jan. 26, 2017; https://www.youtube.com/watch?v=VEMvKm6LjXc.

"Meike MK320-S TTL Speedlite Mini Flash", Product description available on Amazon; Unknown first available date but prior to filing of present application; https://www.amazon.in/Meike-MK320-S-Speedlite-Flash-Light/dp/B01N4D5TTW.

"Use Gentle Sleep and Wake with Google Home", Google Home Support; Published prior to filing of present application; https://support.google.com/googlenest/answer/9304145?hl=en.

"Wipro 22-Watt LED Batten Light", Product available on Amazon; Unknown first available date but prior to filing of present application; https://www.amazon.in/Wipro-Changing-22-Watt-Batten-Neutral/dp/B01CG5PZTC.

* cited by examiner

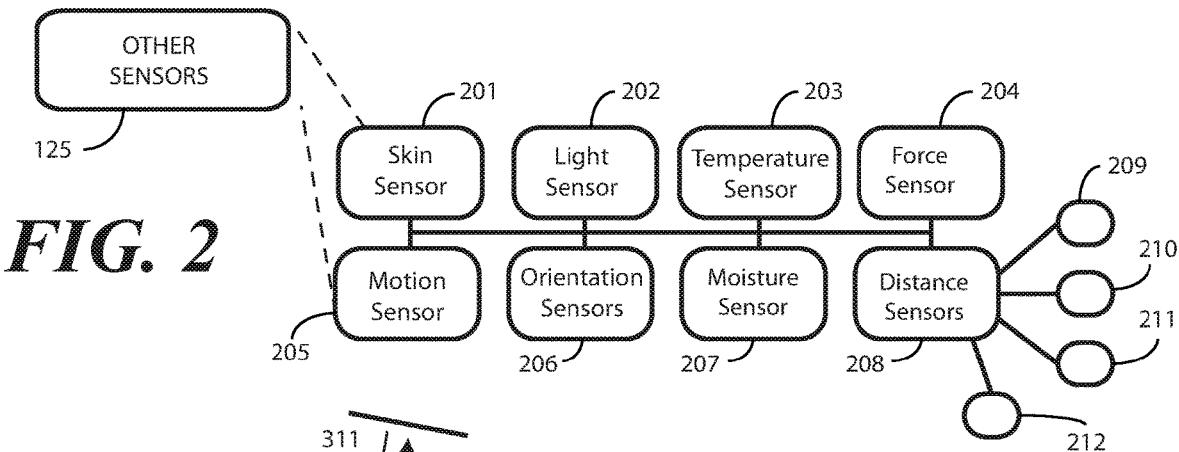
FIG. 2
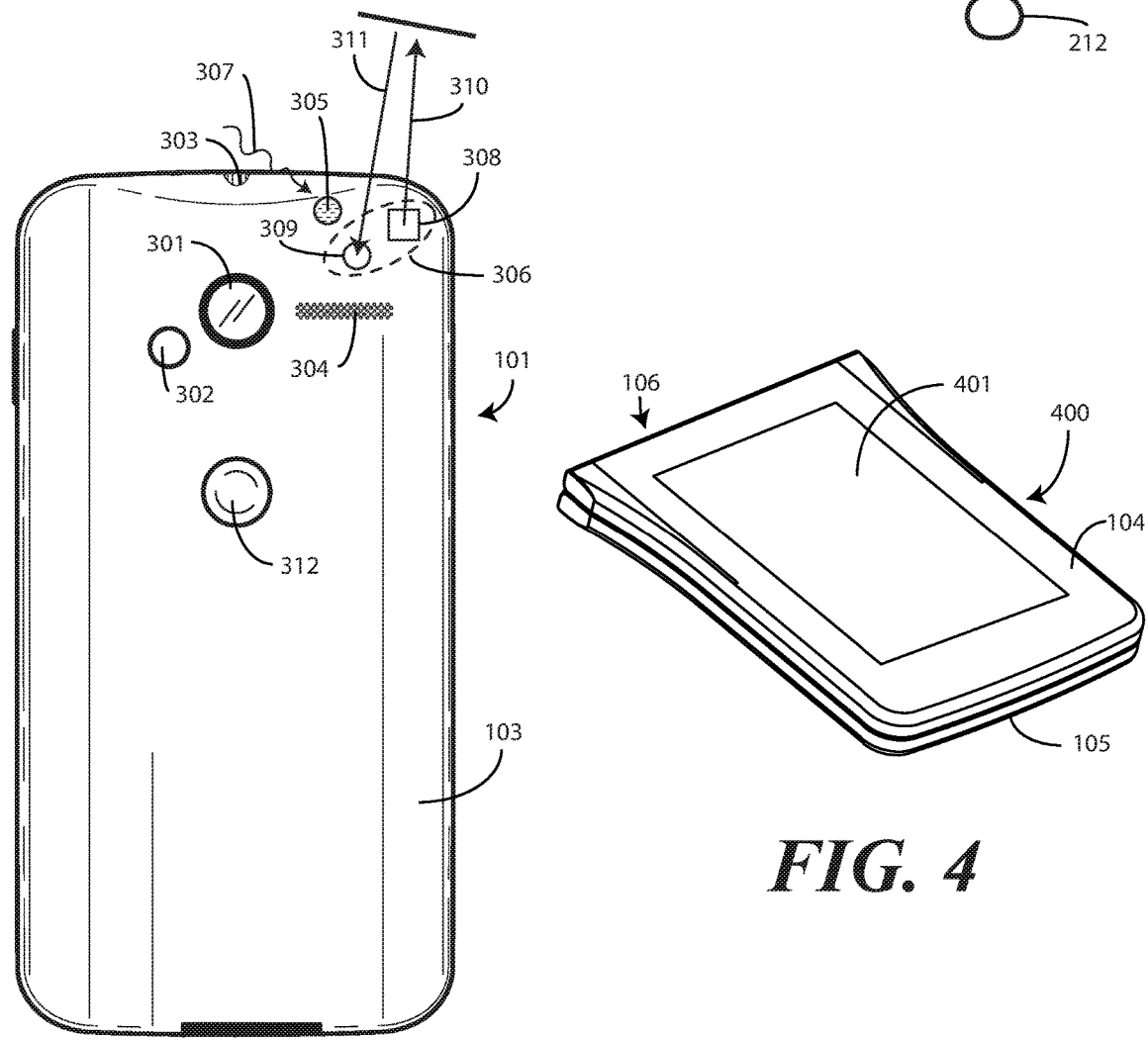
FIG. 3
FIG. 4

METHODS AND SYSTEMS FOR FEATURE OPERATIONAL MODE CONTROL IN AN ELECTRONIC DEVICE

CROSS REFERENCE TO PRIOR APPLICATIONS

This application claims priority and benefit under 35 U.S.C. § 119 from Chinese Patent Application No. 202010325690.3, filed Apr. 23, 2020, which is incorporated by reference by rule in accordance with 37 CFR § 1.57.

BACKGROUND

Technical Field

This disclosure relates generally to electronic devices, and more particularly to electronic devices with sensors.

Background Art

Portable electronic communication devices, such as smartphones and tablet computers, are becoming ubiquitous in society. As the technology employed by these devices has advanced, so too have their feature sets. A modern smartphone, for example, includes not only wireless communication features for making voice calls and sending text messages, but may also include a camera, projector, loudspeaker, compass, or even an altimeter. While these many features are useful, it can sometimes be cumbersome to actuate and control each individual feature. It would be advantageous to have improved devices and methods for controlling modes of operation of features in an electronic device.

BRIEF DESCRIPTION OF THE DRAWINGS

FIG. 2 illustrates one or more sensors suitable for inclusion with an explanatory electronic device in accordance with one or more embodiments of the disclosure.

FIG. 3 illustrates a rear side of one explanatory electronic device in accordance with one or more embodiments of the disclosure.

FIG. 4 illustrates one explanatory electronic device with a first device housing pivoted about a hinge relative to a second device housing to a closed position in accordance with one or more embodiments of the disclosure.

Figure 1:
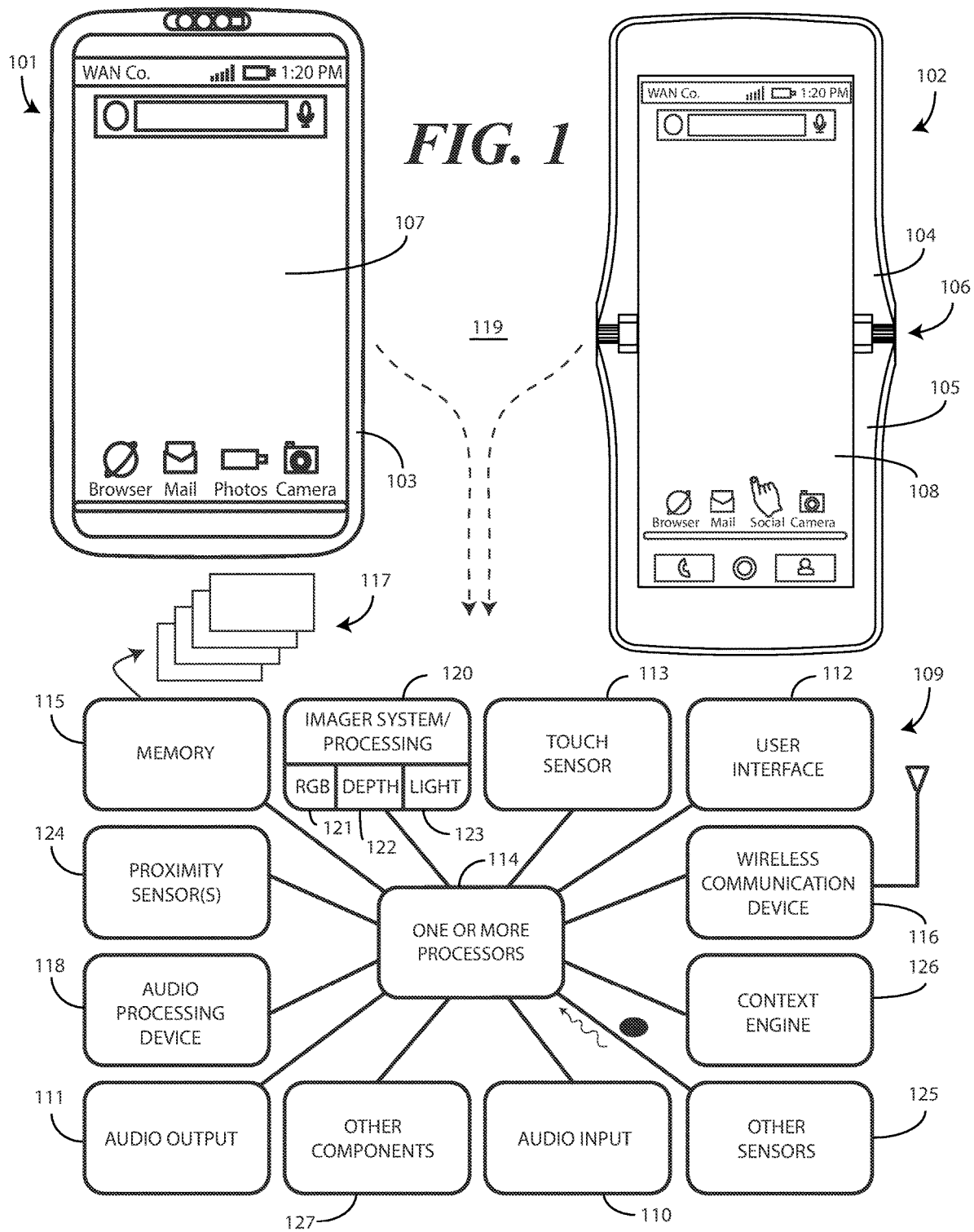
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to detecting a device function trigger input while a device function is operating in a first mode of operation and then transitioning the device function to a second mode of operation in response to the device function trigger input. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of transitioning a device feature from an initial mode of operation to a subsequent mode of operation when a device function trigger input is received while the device function is operating in the initial mode of operation as described herein. The non-processor circuits may include, but are not limited to, a radio receiver, a radio transmitter, signal drivers, clock circuits, power source circuits, and user input devices. As such, these functions may be interpreted as steps of a method to perform transitions from an initial mode of operation to a subsequent mode of operation in response to a detected device function trigger input. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within 0.5 percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device and corresponding methods configured to detect, with one or more sensors of the electronic device, a first device function trigger input requesting performance of a device function. Illustrating by example, one or more sensors of the electronic device can detect one or more gestures as user inputs at a user interface that are predefined as device function trigger inputs. In one embodiment for instance, the electronic device includes one or more motion sensors that detect a lifting gesture moving the electronic device in three-dimensional space. In one or more embodiments, the lifting gesture defines a predefined user input requesting performance of one or more control operations, such as actuating a feature of the electronic device.

When the electronic device, using one or more sensors, detects the device function trigger input, one or more processors of the electronic device can actuate the device function. Advantageously, this use of gesture input as a device function trigger input provides a natural, immediate, and intuitive method of controlling the electronic device without the necessity of delivering voice commands or touch input to the user interface of the electronic device. With an electronic device configured in accordance with embodiments of the disclosure, a user can trigger, activate, actuate, or initiate control functions and features, and can perform control operations via simple gesture motions.

In one or more embodiments, the one or more processors of the electronic device initially, upon actuation, operate the device function in a first mode of operation in response to the one or more sensors detecting the first device function trigger input. Using a flashlight function as an illustrative example, in one or more embodiments when the one or more sensors detect the first device function trigger input, the one or more processors actuate and operate the light (which may be a light source serving as a flash for a camera or other image capture device) in a first mode of operation by emitting light with a first, low level luminous intensity.

In one or more embodiments, while the one or more processors are operating the device function in the first mode of operation in response to the first device function trigger input, the one or more sensors continue to monitor for additional device function trigger inputs. Continuing the flashlight example, embodiments of the disclosure contemplate that when a gesture input, such as a gesture motion translating the electronic device in a back and forth or chopping motion in three-dimensional space, causes the one or more processors to actuate the flashlight function to begin operating by emitting light, the light may be shining towards a person's eyes. Since an immediately appearing bright light from darkness can be unnerving or annoying, in one or more embodiments the one or more processors cause the flashlight function to actuate and become operational in first mode of operation by emitting the light at a first, low level luminous intensity.

However, in one or more embodiments the one or more sensors continue to monitor for additional device function trigger inputs while the device function is operating in this first mode of operation. In one or more embodiments, when the one or more sensors detect a second device function trigger input while the device function is operating in the first mode of operation, the one or more processors transition the device function from operating in the first mode of operation to a second mode of operation. In one or more embodiments, the second mode of operation is different from the first mode of operation.

Continuing the flashlight function example, in one or more embodiments when the one or more sensors detect the first device function trigger input, the one or more processors cause the flashlight function to initially operate in a first mode of operation by emitting light at a first, low luminous intensity. In one or more embodiments, this first, low luminous intensity is sufficiently low that if it happens to be shining towards a person's eyes, it will not be alarming, blinding, or disconcerting. In one or more embodiments, this first, low luminous intensity can be user-defined using a menu or control settings of the electronic device.

However, upon the one or more sensors detecting the second device function trigger input, which may be a gesture twisting the electronic device about a major axis for example, while the flashlight function is operating in the first mode of operation, the one or more processors cause the flashlight function to operate in a second mode of operation by emitting light at a second, higher luminous intensity. In one or more embodiments, this second, higher luminous intensity is a maximum luminous intensity of the light source. In one or more embodiments, this second, higher luminous intensity can also be user-defined using a menu or control settings of the electronic device.

Thus, in one embodiment a person can actuate the flashlight function at a first, lower luminous intensity by making a gesture that moves the device in a chopping motion in three-dimensional space, but can advantageously transition the light output of the flashlight function to a second, higher luminous intensity by making another gesture twisting the electronic device about an axis in three-dimensional space. This allows the person to actuate the flashlight at a first, low intensity, but then transition the flashlight to a second, higher intensity upon twisting the light toward a target of interest. Using this innovative, intuitive technique, if the light of the flashlight function were inadvertently aimed at a person when the authorized user of the electronic device launched the flashlight function with the "chop-chop" motion, they would not be surprised or annoyed due to the fact that the light was being emitted at a low, comfortable level. However, when the authorized user of the electronic device twists the light output of the flashlight function toward a target object, in one or more embodiments the one or more processors transition the light output from the first, lower level of luminous intensity to a second, higher luminous intensity. Advantageously, embodiments of the disclosure provide a quick, easy, and intuitive way to transition features or functions of an electronic device between different modes of operation.

While a flashlight function is one illustrative device function that will be described for explanatory purposes below, the methods and systems for detecting a second device function trigger input when one or more processors are operating a device feature or function in a first mode of operation to transition the feature or function to a second mode of operation can be extended to other device features as well. Using an imager as another example, a person may make a gesture input translating the electronic device in a chopping motion to launch the imager in a color mode of operation, but may then make another gesture sharply twisting the electronic device in three-dimensional space to transition the imager to a black and white mode of operation for instance. If the device function is that of an audio output device, such as a loudspeaker, a person may make a gesture input translating the electronic device in a chopping motion to cause the loudspeaker to begin emitting sound at a first, low volume, but may then make another gesture twisting the electronic device in three-dimensional space about an axis to transition—gradually, slowly, quickly, or substantially instantaneously—the loudspeaker to a second, louder volume. Other examples of features and their modes of operation will be described below with reference to FIGS. 11-14. Still others will be obvious to those of ordinary skill in the art having the benefit of this disclosure.

Turning now to FIG. 1, illustrated therein are two explanatory electronic devices 101,102, each configured in accordance with one or more embodiments of the disclosure. Each electronic device 101,102 of FIG. 1 is configured as a portable electronic device. For illustrative purposes, each electronic device 101,102 is shown as a smartphone that includes one or more device features that can be actuated, adjusted, and terminated by a user. However, the electronic devices 101,102 could be any number of other devices having selectively actuatable device features as well, including tablet computers, gaming devices, multimedia players, and so forth. Still other types of electronic devices configured in accordance with one or more embodiments of the disclosure as will be readily appreciated by those of ordinary skill in the art having the benefit of this disclosure.

Electronic device 101 is configured as a "candy bar" device in which the device housing 103 is substantially rigid, i.e., not deformable, and includes no hinges or other deformable components. By contrast, electronic device 102 is configured as a "flip" device that includes a first device housing 104 and a second device housing 105. In one or more embodiments, a hinge 106 couples the first device housing 104 to the second device housing 105.

Thus, while the display 107 of electronic device 101 is always exposed and accessible, in electronic device 102 the first device housing 104 is selectively pivotable about the hinge 106 relative to the second device housing 105 to selectively conceal, and reveal, the primary display 108. (As shown in FIG. 4, the electronic device 102 can optionally include secondary displays 401 that are exposed when the first device housing 104 is pivoted about the hinge 106 relative to the second device housing 105 from the axially displaced open position of FIG. 1 to the closed position 400 of FIG. 4.) In one or more embodiments, the first device housing 104 of electronic device 102 is selectively pivotable about the hinge 106 between a closed position (FIG. 4) and the axially displaced open position of FIG. 1.

In one or more embodiments the device housing 103 of electronic device 101 and/or the first device housing 104 and the second device housing 105 of electronic device 102 are manufactured from a rigid materials such as a rigid thermoplastic, metal, or composite material, although other materials can be used. Still other constructs will be obvious to those of ordinary skill in the art having the benefit of this disclosure. In the illustrative embodiment of FIG. 1, electronic device 102 includes only a single hinge 106. However, in other embodiments two or more hinges can be incorporated into the electronic device 102 to allow it to be folded in multiple locations.

Moreover, while electronic device 102 includes a hinge 106, embodiments of the disclosure are not so limited. In other embodiments, the electronic device 102 will be bendable, but will not include a hinge 106, such as when the first device housing 104 and the second device housing 105 are manufactured from bendable materials. In still other embodiments, the electronic device 102 can be bendable via a combination of hinge components and non-hinge components.

Illustrating by example, in another embodiment electronic device 102 can include a single housing, like electronic device 101, but that is flexible rather than being rigid. In one embodiment, the housing may be manufactured from a malleable, bendable, or physically deformable material such as a flexible thermoplastic, flexible composite material, flexible fiber material, flexible metal, organic or inorganic textile or polymer material, or other materials. The housing could be formed from a single flexible housing member or from multiple flexible housing members.

In other embodiments, the housing could be a composite of multiple components. For instance, in another embodiment the housing could be a combination of rigid segments connected by hinges or flexible materials. Still other constructs will be obvious to those of ordinary skill in the art having the benefit of this disclosure.

While electronic device 101 and electronic device 102 are illustrated as being hand-held devices, they could also be configured as a wearable device. Illustrating by example, electronic devices configured in accordance with embodiments of the disclosure can include a housing and one or more straps that allow the electronic device to be worn around a wrist as a watch or folded over and clipped to a garment. Other types of wearable electronic devices and/or other mechanical configurations of wearable electronic devices will be obvious to those of ordinary skill in the art having the benefit of this disclosure.

As shown in FIG. 3, one or more features can be incorporated into the housing 103 of electronic device 101 (or alternatively into one or both of the first device housing 104 of electronic device 102 or the second device housing 105 of electronic device 101). Examples of such features include a camera or imager 301, a light output 302, which can be used as a flash or flashlight in one or more embodiments, one or more microphones 303, and/or an optional speaker port 304. In one or more embodiments, the light output 302 can comprise a light, such as light source (123) of FIG. 1, situated on a housing 103 of the electronic device 101. Similarly, the light output 302 can comprise a light, such as light source (123) of FIG. 1, being situated on one or both of the first device housing (104) or second device housing (105) of electronic device (102) in other embodiments.

In the illustrative embodiment of FIG. 3, a user interface component 312, which may be a button, touch sensor, or touch sensitive surface, can also be disposed along the housing 103. While such features are shown being disposed on the rear major face of electronic device 101 in this embodiment, they could be located elsewhere, such as on the front major face, on side minor faces, on one or both of the device housings of electronic device 102, or in other locations in other embodiments.

Also illustrated in FIG. 1 is one explanatory block diagram schematic 109 of one or more components suitable for inclusion with the electronic device 101,102. In one or more embodiments, the block diagram schematic 109 is configured as a printed circuit board assembly disposed within the device housing 103 of electronic device 101 or one or both of the first device housing 104 and/or second device housing 105 of electronic device 102. Various components can be electrically coupled together by conductors or a bus disposed along one or more printed circuit boards. It should be noted that the block diagram schematic 109 includes many components that are optional, but which are included in an effort to demonstrate how varied electronic devices configured in accordance with embodiments of the disclosure can be.

Illustrating by example, in one or more embodiments the electronic device 101,102 includes an audio input 110 to receive audio input and an audio output 111 to deliver audio output. Where the electronic device 101,102 is configured to be purely a voice assistant device, a display 107,108 would be optional, in that it is not required for this voice-based user interaction. Thus, it is to be understood that the block diagram schematic 109 of FIG. 1 is provided for illustrative purposes only and for illustrating components of one electronic device 101,102 in accordance with embodiments of the disclosure.

The block diagram schematic 109 of FIG. 1 is not intended to be a complete schematic diagram of the various components required for an electronic device 101,102. Therefore, other electronic devices in accordance with embodiments of the disclosure may include various other components not shown in FIG. 1, or may include a combination of two or more components or a division of a particular component into two or more separate components, and still be within the scope of the present disclosure.

The illustrative block diagram schematic 109 of FIG. 1 includes many different components. Embodiments of the disclosure contemplate that the number and arrangement of such components can change depending on the particular application. For example, a wearable electronic device may have fewer, or different, components from a non-wearable electronic device. Similarly, an electronic device configured as a dedicated voice assistant may have fewer, or different, components from a smartphone, and so forth. Accordingly, electronic devices configured in accordance with embodiments of the disclosure can include some components that are not shown in FIG. 1, and other components that are shown may not be needed and can therefore be omitted.

The illustrative block diagram schematic 109 includes a user interface 112. In one or more embodiments, the user interface 112 includes the display 107,108 (optionally external display 401 of FIG. 4, where included) and one or more other sensors 125. The one or more other sensors 125 can include a touch sensor 113, as well as other sensors that which will be described in more detail below.

In one embodiment, the electronic device 101,102 includes one or more processors 114. In one embodiment, the one or more processors 114 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 109. Each of the application processor and the auxiliary processor(s) can be configured to process and execute executable software code to perform the various functions of the electronic device 101,102 with which the block diagram schematic 109 operates. A storage device, such as memory 115, can optionally store the executable software code used by the one or more processors 114 during operation.

In this illustrative embodiment, the block diagram schematic 109 also includes a communication circuit 116 that can be configured for wired or wireless communication with one or more other devices or networks. The networks can include a wide area network, a local area network, and/or personal area network. The communication circuit 116 may also utilize wireless technology for communication, such as, but are not limited to, peer-to-peer or ad hoc communications such as HomeRF, Bluetooth and IEEE 802.11 and other forms of wireless communication such as infrared technology. The communication circuit 116 can include wireless communication circuitry, one of a receiver, a transmitter, or transceiver, and one or more antennas.

In one embodiment, the one or more processors 114 can be responsible for performing the primary functions of the electronic device with which the block diagram schematic 109 is operational. For example, in one embodiment the one or more processors 114 comprise one or more circuits operable with the user interface 112 to present presentation information to a user. Additionally, the one or more processors 114 can be operable with the audio output 111 to deliver audio output to a user. The executable software code used by the one or more processors 114 can be configured as one or more modules 117 that are operable with the one or more processors 114. Such modules 117 can store instructions, control algorithms, and so forth.

In one or more embodiments, the block diagram schematic 109 includes an audio processor 118. In one or more embodiments, the audio processor 118 is operable to receive audio input from a source, such as a person or persons, who are situated within an environment 119 about the electronic device 101,102. The audio processor 118 can also receive audio input from the environment 119 as well. The audio processor 118 can include hardware, executable code, and speech monitor executable code in one embodiment.

In one embodiment, the audio processor 118 is configured to implement a voice control feature that allows the electronic device 101,102 to function as a voice assistant device, which is a digital assistant using voice recognition, speech synthesis, and natural language processing to receive audio input comprising a voice command from a source, determine the appropriate response to the voice command, and then deliver the response in the form of audio output in response to receiving the audio input from the source. When so configured, a user can speak commands to cause the one or more processors 114 of the electronic device 101,102 to execute a control operation. In one or more embodiments the audio processor 118 listens for voice commands, processes the commands and, in conjunction with the one or more processors 114, performs one or more control operations, such as delivering audio output, in response to receiving audio input.

Various sensors can be operable with the one or more processors 114. A first example of a sensor that can be included with the various sensors is a touch sensor 113. The touch sensor 113 can include a capacitive touch sensor, an infrared touch sensor, resistive touch sensors, or another touch-sensitive technology. Capacitive touch-sensitive devices, for example, include a plurality of capacitive sensors, e.g., electrodes, which are disposed along a substrate. Each capacitive sensor is configured, in conjunction with associated control circuitry, e.g., the one or more processors 114, to detect an object in close proximity with—or touching—the surface of the display 101 and/or the housing 103 (or first device housing 104 or second device housing 105) of the electronic device 101,102 by establishing electric field lines between pairs of capacitive sensors and then detecting perturbations of those field lines. Other examples of touch sensors 113 will be obvious to those of ordinary skill in the art having the benefit of this disclosure.

An imager processor system 120 can be included in the electronic device 101,102 and can be operable with the one or more processors 114. The imager processor system can include one or more sensors, which can include a front-facing camera or imager, a rear-facing camera or imager, or another imager. In one or more embodiments the one or more sensors operable with the imager processor system 120 comprise at least one or more of an imager 121, a depth imager 122, and a light source 123 that is operable with one or both of the imager 121 and/or depth imager 122. As will be described in more detail below and with reference to FIG. 3, the imager processor system 120 can also be operable with one or more proximity sensors 124.

In one embodiment, the imager 121 comprises a two-dimensional imager configured to receive at least one image of a person or other objects within an environment 119 of the electronic device 101,102. In one embodiment, the imager 121 comprises a two-dimensional Red-Green-Blue (RGB) imager. In another embodiment, the imager 121 comprises an infrared imager. Other types of imagers suitable for use as the imager 121 of electronic device 101,102 will be obvious to those of ordinary skill in the art having the benefit of this disclosure.

A light source 123 can be operable with the imager 121. For example, the image processors system 120 can cause the light source 123 to momentarily flash when the imager 121 is capturing images. In one or more embodiments, the light source 123 can also be used as a user interface component that is operable with the one or more processors 114. For example, when the one or more processors 114 operate the light source 123 as a user interface component, in one or more embodiments the one or more processors 114 can cause the light source 123 to continually emit light in response to one or more device function trigger inputs, thereby allowing the light source 123 to function as a flashlight or provide a flashlight feature for the electronic device 101,102. Other components of the electronic device 101,102 can be used in a similar manner as user interface components, including the audio output 111, the audio input 110, the display 107,108, the imager 121, and/or the depth imager 122. When operating as a user interface component, the selected device is operable in at least a first mode of operation and a second mode of operation that is different from the first mode of operation in one or more embodiments.

Where included, the depth imager 122 can take a variety of forms. In a first embodiment, the depth imager 122 comprises a pair of imagers separated by a predetermined distance, such as three to four images. This "stereo" imager works in the same way the human eyes do in that it captures images from two different angles and reconciles the two to determine distance.

In another embodiment, the depth imager 122 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth imager 122 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, when included the depth imager 122 adds a third "z-dimension" to the x-dimension and y-dimension defining the two-dimensional image captured by the imager 121. Where the light source 123 includes an infrared light, it can be operable with the depth imager 122 as well.

In one embodiment when the imager processor system 120 detects a person, one or both of the imager 121 and/or the depth imager 122 can capture a photograph and/or depth scan of that person. The imager processor system 120 can then compare the image and/or depth scan to one or more predefined authentication references stored in the memory 115. This comparison, in one or more embodiments, is used to confirm beyond a threshold authenticity probability that the person's face—both in the image and the depth scan—sufficiently matches one or more of the predefined authentication references stored in the memory 115 to authenticate a person as an authorized user of the electronic device 101,102. Beneficially, this optical recognition performed by the imager processor system 120 can allow access to the electronic device 101,102 only when one of the persons detected about the electronic device 101,102 are sufficiently identified as an authorized user of the electronic device 101,102.

The one or more proximity sensors 124, where included, can also take various forms. In one or more embodiments, the one or more proximity sensors 124 fall in to one of two camps: active proximity sensors and "passive" proximity sensors. Either the proximity detector components or the proximity sensor components can be generally used for distance determination, such as measuring distances between objects situated within the environment 119 of the electronic device and/or determining changes in distance between the electronic device 101,102 and objects situated within the environment 119.

As used herein, a "proximity sensor component" comprises a signal receiver only that does not include a corresponding transmitter to emit signals for reflection off an object to the signal receiver. A signal receiver only can be used due to the fact that an external source, such as the body of a person or other heat-generating object external to the electronic device 101,102, can serve as the transmitter. Illustrating by example, in one embodiment the proximity sensor components comprise only a signal receiver to receive signals from objects external to the housing 103 of the electronic device 101,102. In one embodiment, the signal receiver is an infrared signal receiver to receive an infrared emission from a source, such as a human being, when the human being is approaching or near the electronic device 101,102.

Proximity sensor components are sometimes referred to as a "passive IR detectors" due to the fact that a person or other warm object serves as the active transmitter. Accordingly, the proximity sensor component requires no transmitter since objects disposed external to the housing deliver emissions that are received by the infrared receiver. As no transmitter is required, each proximity sensor component can operate at a very low power level.

In one embodiment, the signal receiver of each proximity sensor component can operate at various sensitivity levels so as to cause the at least one proximity sensor component to be operable to receive the infrared emissions from different distances. For example, the one or more processors 114 can cause each proximity sensor component to operate at a first "effective" sensitivity so as to receive infrared emissions from a first distance. Similarly, the one or more processors 114 can cause each proximity sensor component to operate at a second sensitivity, which is less than the first sensitivity, so as to receive infrared emissions from a second distance, which is less than the first distance. The sensitivity change can be effected by causing the one or more processors 114 to interpret readings from the proximity sensor component differently.

By contrast, "proximity detector components" include a signal emitter and a corresponding signal receiver, which constitute an "active" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers that define an active IR pair.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

Turning briefly to FIG. 3, illustrated therein is the difference between a proximity sensor component 305 and a proximity detector components 306 as those terms are used herein. Illustrated therein are a proximity sensor component 305 and a proximity detector component 306. These components can be disposed at different locations along the housing 103 (or alternatively on first device housing 104 or second device housing 105 of electronic device 102), including corners, major faces, minor faces, and so forth.

In this embodiment, the proximity sensor component 305 comprises a signal receiver only. One example of a signal receiver is that of an infrared photodiode to detect an infrared emission 307 from an object external to the housing 103 of the electronic device 101 (or alternatively on first device housing 104 or second device housing 105 of electronic device 102). No corresponding transmitter is included or required for the proximity sensor component 305 to function. As no active transmitter emitting signals is included, the proximity sensor component 305 is sometimes referred to as a "passive IR" proximity sensor. As the proximity sensor component 305 receives thermal emissions from an object, in one or more embodiments they can be used as temperature sensors.

By contrast, the proximity detector component 306 can be an infrared proximity sensor set that uses a signal emitter 308 that transmits a beam 310 of infrared light that reflects from a nearby object and is received by a corresponding signal receiver 309. A proximity detector component 306 can be used, for example, to compute the distance to any nearby object from characteristics associated with the reflected signals 311. The reflected signals 311 are detected by the corresponding signal receiver 309, which may be an infrared photodiode used to detect reflected light emitting diode (LED) light, respond to modulated infrared signals, and/or perform triangulation of received infrared signals. Accordingly, the proximity detector component 306 can be used to determine of the electronic device 101 (or alternatively electronic device 102) is covered by clothing in one or more embodiments.

Turning now back to FIG. 1, other sensors 125 can be operable with the one or more processors 114 as well. Turning briefly to FIG. 2, illustrated therein are several examples of other sensors 125 suitable for inclusion in the electronic device 101,102 in various combinations.

In one embodiment, a skin sensor 201 is configured to determine when the electronic device (101,102) is touching the skin of a person. For example, in one or more embodiments the skin sensor 201 can determine when the electronic device (101,102) is being held within the hand of a user. In one embodiment, the skin sensor 201 can include a substrate with an electrode disposed thereon. The electrode can confirm the object touching the skin sensor 201 is skin by detecting electrical signals generated by a heartbeat in one embodiment. Other forms of skin sensors will be obvious to those of ordinary skill in the art having the benefit of this disclosure.

The other sensors 125 can include a light sensor 202. The light sensor 202 can be used to detect whether or not direct light is incident on the housing (103) of the electronic device (101,102) in one or more embodiments. The light sensor 202 can also be used to detect an intensity of ambient light is above or below a predefined threshold in one or more embodiments.

In one or more embodiments the light sensor 202 can detect changes in optical intensity, color, light, or shadow in the near vicinity of the electronic device (101,102). This can be used to make inferences about whether the electronic device (101,102) is in a stowed state. If, for example, the light sensor 202 detects low-light conditions, i.e., when the intensity of received ambient light is below a predefined threshold, this can indicate that the electronic device (101, 102) is disposed within a pocket, drawer, or purse. In one embodiment, the light sensor 202 can be configured as an image-sensing device that captures successive images about the device and compares luminous intensity, color, or other spatial variations between images to detect weather conditions.

A temperature sensor 203 can be configured to monitor the temperature of the environment. The temperature sensor 203 can take various forms. In one embodiment, the temperature sensor 203 is simply a proximity sensor component. In another embodiment, the temperature sensor 203 comprises a simple thermopile. In another embodiment, the temperature sensor 203 comprises an infrared imager that captures the amount of thermal energy emitted by an object. Other types of temperature sensors will be obvious to those of ordinary skill in the art having the benefit of this disclosure.

The other sensors 125 can include a force sensor 204. The force sensor 204 can take various forms. For example, in one embodiment, the force sensor 204 comprises resistive switches or a force switch array configured to detect contact with one or both of the display (107,108) or the housing (103) of the electronic device (101,102). In another embodiment, the force sensor 204 can be capacitive. In yet another embodiment, piezoelectric sensors can be configured to sense force as well. Other types of force sensors will be obvious to those of ordinary skill in the art having the benefit of this disclosure.

The other sensors 125 can include one or more motion sensors 205. The one or more motion sensors 205 can include one or more accelerometers or gyroscopes. For example, an accelerometer may be embedded in the electronic circuitry of the electronic device (101,102) to show vertical orientation, constant tilt and/or whether the electronic device (101,102) is stationary. The measurement of tilt relative to gravity is referred to as "static acceleration," while the measurement of motion and/or vibration is referred to as "dynamic acceleration." A gyroscope can be used in a similar fashion.

In one or more embodiments, the one or more motion sensors 205 can detect motion of the electronic device (101,102). The one or more motion sensors 205 can be used to sense some of the gestures of a user as well. The one or more motion sensors 205 can be used to determine the spatial orientation of the electronic device (101,102) as well in three-dimensional space by detecting a gravitational direction. The one or more motion sensors 205 can also include an electronic compass to detect the spatial orientation of the electronic device (101,102) relative to the earth's magnetic field.

The other sensors 125 can also include one or more microphones 206 operable to receive acoustic input. While the one or more microphones 206 can be used to sense voice input, voice commands, and other audio input, in one or more embodiments they can also be used as environmental sensors to sense environmental sounds such as rumpling of soft surfaces of textile materials or other similar materials encapsulating the electronic device (101,102) when the electronic device 101,102 is in a stowed state. Alternatively, the one or more microphones 206 can be used to detect the nearby presence of items when the electronic device (101, 102) is in a stowed state, such as coins, medications, grooming items, notecards, keys, lotions, notepads, lip balm, and other items that may be near the electronic device (101,102) when stowed in a container such as a purse.

The other sensors 125 can also include a moisture sensor 207. The moisture sensor 207 can be configured to detect the amount of moisture on or about the display (107,108) or the housing (103) of the electronic device (101,102). The moisture sensor 207 can be realized in the form of an impedance sensor that measures impedance between electrodes. Other types of moisture sensors will be obvious to those of ordinary skill in the art having the benefit of this disclosure.

The other sensors 125 can include a distance measurement sensor 208. The distance measurement sensor 208 can take various forms. In one or more embodiments, the distance measurement sensor 208 comprises a time of flight depth imager 209, which can also be one form of depth imager (122) as described above. In another embodiment, the distance measurement sensor 208 can comprise a radar device 210. In still another embodiment, the distance measurement sensor 208 can comprise a sonar device 211. In yet another embodiment, the distance measurement sensor 208 can comprise an ultrasound distance measurement device 212.

Regardless of type, in one or more embodiments the distance measurement sensor 208 can perform distance determination operations. For example, the distance measurement sensor 208 can measure distances between objects situated within the environment (119) of the electronic device (101,102) in one or more embodiments. In other embodiments, the distance measurement sensor 208 can determine changes in distances between the electronic device (101,102) and objects situated within the environment (119). Combinations of these operations can be performed as well.

Turning now back to FIG. 1, a context engine 126 can be operable with the other sensors 125 to detect, infer, capture, and otherwise determine persons and actions that are occurring in an environment 119 about the electronic device 101,102. For example, where included one embodiment of the context engine 126 determines assessed contexts and frameworks using adjustable algorithms of context assessment employing information, data, and events. These assessments may be learned through repetitive data analysis. Alternatively, a user may employ the user interface 112 to enter various parameters, constructs, rules, and/or paradigms that instruct or otherwise guide the context engine 126 in detecting stowed states of the electronic device 101,102, held states of the electronic device 101,102, multi-modal social cues, emotional states, moods, and other contextual information. The context engine 126 can comprise an artificial neural network or other similar technology in one or more embodiments.

In one or more embodiments, the context engine 126 is operable with the one or more processors 114. In some embodiments, the one or more processors 114 can control the context engine 126. In other embodiments, the context engine 126 can operate independently, delivering information gleaned from detecting stowed states of the electronic device 101,102, held states of the electronic device 101,102, multi-modal social cues, emotional states, moods, and other contextual information to the one or more processors 114. The context engine 126 can receive data from the other sensors 125. In one or more embodiments, the one or more processors 114 are configured to perform the operations of the context engine 126.

Other components 127 operable with the one or more processors 114 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as the one or more loudspeakers or other alarms and/or buzzers. The other components 127 can also include a mechanical output component such as vibrating or motion-based mechanisms.

Figure 5:
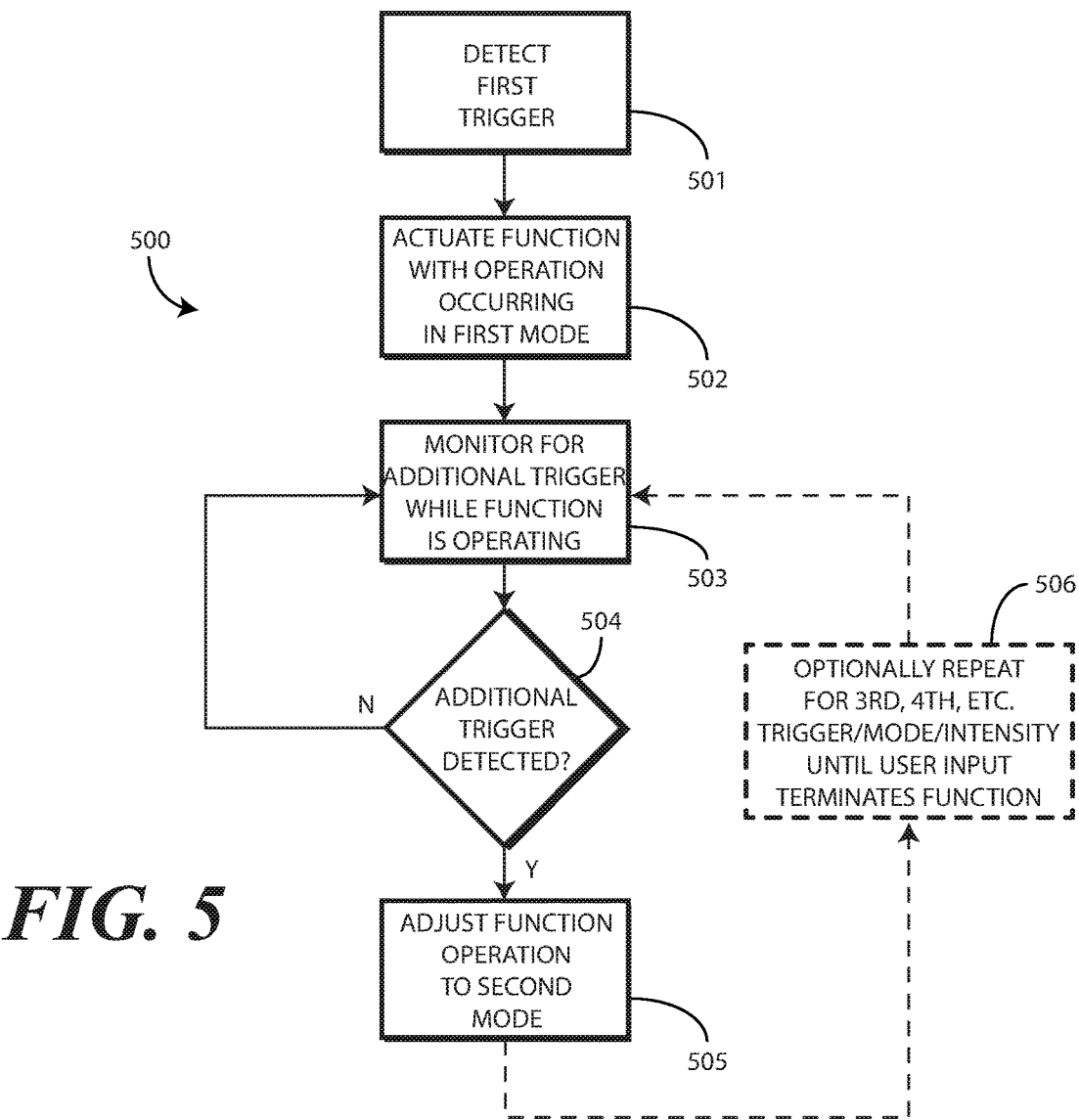
FIG. 5 illustrates one explanatory method in accordance with one or more embodiments of the disclosure.

Now that various hardware components have been described, attention will be turned to methods of using electronic devices in accordance with one or more embodiments of the disclosure. Turning now to FIG. 5, illustrated therein is one explanatory method 500 for the electronic device 101,102 of FIG. 1. More detailed methods will be described thereafter with reference to subsequent figures.

Beginning at step 501, one or more sensors (125) of an electronic device (101,102) detect a first device function trigger input. In one or more embodiments, the first device function trigger input requests actuation and/or operation of a device feature, or alternatively commencement and/or performance of a device function. In one or more embodiments, the first device function trigger input requests actuation and operation of a user interface component that performs a device function. For example, as will be described below with reference to FIGS. 9-10, in one or more embodiments the device function comprises a flashlight function where a light source emits light when the flashlight function is operating. Accordingly, in one or more embodiments the device function trigger input detected at step 501 may request that one or more processors (114) of the electronic device (101,102) cause a light source (123), operating as a user interface component, to actuate and emit light, thereby providing the flashlight function. Other examples of user interface components and corresponding device functions will be described below with reference to FIGS. 11-14. Still others will be obvious to those of ordinary skill in the art having the benefit of this disclosure.

In one or more embodiments, the device function trigger input detected at step 501 comprises a gesture input. The gesture input can take a variety of forms. Illustrating by example, in one embodiment the gesture input comprises a hand or other object approaching the electronic device (101,102), as detected by the one or more proximity sensors (124), depth imager (122) or other sensors (125). In another embodiment, the gesture input comprises a user twisting the electronic device (101,102) about a major or minor axis in three-dimensional space, as detected by the motion sensor (205), imager (121), or other sensors (125).

In still another embodiment, the user can deliver the gesture input by moving a hand or arm in predefined motions in close proximity to the electronic device (101,102), as detected by the one or more proximity sensors (124), the imager (121), the depth imager (122), or the other sensors (125). In yet another embodiment, the user can deliver gesture input by lifting, shaking, translating, or otherwise deliberately moving the electronic device (101,102) in three-dimensional space, as detected by the motion sensor (205), imager (121), or other sensors (125). Other examples of device function trigger inputs will be described below with reference to FIG. 8. Still others will be obvious to those of ordinary skill in the art having the benefit of this disclosure.

In one or more embodiments, the first device function trigger input detected at step 501 comprises a gesture input translating the electronic device (101,102) back and forth in three-dimensional space. For example, the gesture input can translate the electronic device (101,102) in a chopping motion in the three-dimensional space in a chopping motion. In so doing, the user can shake the electronic device (101,102) up and down in a "chop chop" motion.

In one or more embodiments, this gesture input comprises a predefined gesture input associated with a predefined user interface component to be actuated, operated, and/or performed by the one or more processors (114) of the electronic device (101,102) to provide a device feature of the electronic device (101,102). Thus, the device function trigger input detected at step 501 comprises a request for the one or more processors (114) to control or operation a user interface component to perform a predefined device function in one or more embodiments.

The predefined device function can vary, just as does the device function trigger input. Illustrating by example, in one embodiment the user interface component comprises a display (107,108), with the device function comprising turning ON the display (107,108), with this device function corresponding to a device function trigger input in which a gesture input comprises a hand or other object approaching the electronic device (101,102). In another embodiment, the user interface component comprises a light source (123), with the device function comprising actuating and/or operating a flashlight mode, e.g., by illuminating the display to a maximum brightness or by causing the light source (123) to illuminate, with this device function corresponding to a device function trigger input comprising a gesture shaking the electronic device (101,102) up and down in a "chop chop" motion in three-dimensional space.

At step 502, in one or more embodiments the one or more processors (114), actuate, perform, and/or operate the device function in response to receiving the device function trigger input at step 501. Using the flashlight function as an example, in one or more embodiments when a "chop chop" motion of the electronic device (101,102) is detected at step 501, at step 502 the one or more processors (114) cause a light source (123) of the electronic device (101,102) to turn ON, i.e., start and continue emitting light.

Thus, in one or more embodiments when the electronic device (101,102), using one or more sensors (125), detects the device function trigger input at step 501, one or more processors (114) of the electronic device (101,102) can actuate, perform, and/or operate a corresponding device function in response at step 502. Advantageously, this use of a device function trigger input, one example of which is a gesture input translating the electronic device (101,102) in three-dimensional space, provides a natural, immediate, and intuitive method of controlling the electronic device (101,102) without the necessity of delivering voice commands or touch input to the user interface (112) of the electronic device (101,102). Using the method 500 of FIG. 5, a user can trigger, activate, actuate, or initiate control features and functions and perform control operations via simple gesture motions.

In one or more embodiments, step 502 comprises the one or more processors (114) operating the device function in a first mode of operation in response to the first device function trigger input received at step 501. Illustrating by example, in one or more embodiments step 502 comprises the one or more processors (114) causing the light source (123) to perform the flashlight function in the first mode of operation by emitting light with a first luminous intensity. In one or more embodiments, this first luminous intensity is a low luminous intensity or minimum luminous intensity of the light source (123). In other embodiments, this first luminous intensity is user definable using a user interface (112) of the electronic device (101,102).

Embodiments of the disclosure contemplate that when a device function trigger input, such as a gesture motion translating the electronic device in a back and forth or chopping motion in three-dimensional space detected at step 501, causes the one or more processors (114) to actuate and/or operate the flashlight function at step 502 by causing the light source (123) to actuate and begin operating by emitting light, that this light may be shining in a person's eyes. Since an immediately appearing bright light from darkness can be unnerving or annoying, in one or more embodiments the one or more processors (114) of the electronic device (101,102) operate the flashlight function at step 502 in a first mode of operation where the light source (123) actuates and becomes operational by emitting light at a first, low level luminous intensity. Accordingly, when operating in the first mode of operation the one or more processors (114) cause the light source (123) to emit the light at a first, low brightness level.

At step 503, the one or more sensors (125) of the electronic device (101,102) continue to monitor for additional device function trigger inputs. In one or more embodiments, step 503 occurs while the one or more processors (114) of the electronic device (101,102) are operating the device function in the first mode of operation at step 502. Thus, in the flashlight example step 503 occurs while the one or more processors (114) are operating the light source (123) providing the flashlight function in the first mode of operation in one or more embodiments.

Decision 504 then detects, with the one or more sensors (125) of the electronic device (101,102), whether a second device function trigger input is detected while the device function is operating in the first mode of operation. In one or more embodiments, when the one or more sensors (125) detect a second device function trigger input at decision 504 while the device function is operating in the first mode of operation, the one or more processors (114) transition the device function from operating in the first mode of operation to a second mode of operation at step 505. Accordingly, in one or more embodiments, step 505 comprises the one or more processors (114) of the electronic device (101,102) operating the device function in a second mode of operation in response to decision 504 detecting the second device function trigger input.

Continuing with the flashlight function example, in one or more embodiments when the one or more sensors (125) detect the first device function trigger input at step 501, the one or more processors (114) cause the flashlight function to initially operate in a first mode of operation at step 502 by emitting light at a first, low luminous intensity. However, upon the one or more sensors (125) detecting the second device function trigger input at decision 504 while the flashlight function is operating in the first mode of operation, the one or more processors (114) cause the flashlight function to operate in a second mode of operation at step 505. In one or more embodiments, the second mode of operation of step 505 is different from the first mode of operation at step 502.

In one or more embodiments, the second device function trigger input comprises a gesture twisting the electronic device (101,102) in three-dimensional space. In one or more embodiments, the second device function trigger input comprises twisting the electronic device (101,102) about a major axis in three-dimensional space. In one or more embodiments, the second mode of operation comprises the one or more processors (114) causing the light source (123) to emit light at a second luminous intensity. In one or more embodiments, the second luminous intensity is greater than the first luminous intensity. For example, in one or more embodiments the second luminous intensity comprises a maximum luminous intensity of the light source (123) or the flashlight function (if provided by another technique, such as fully illuminating the display, for example). Thus, when operating in the second mode of operation the light has a second brightness level that is brighter than the first brightness level of the first mode of operation in one or more embodiments.

Figure 6:
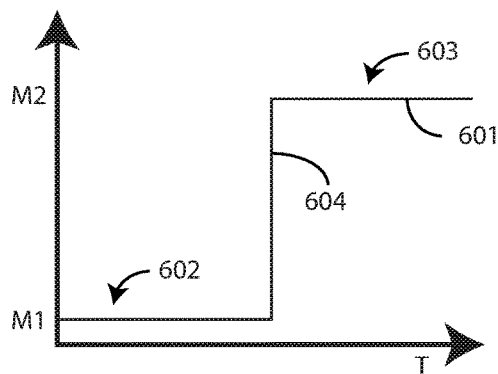
FIG. 6 illustrates one explanatory transition graph for operating modes of a feature of an electronic device in accordance with one or more embodiments of the disclosure.

Embodiments of the disclosure contemplate that the one or more processors (114) can cause the device function to transition from the first more of operation to the second mode of operation in different ways at step 505. Turning briefly to FIG. 6, in one or more embodiments the one or more processors (114) of the electronic device (101,102) can cause a control signal 601 driving the device function to transition from a level 602 corresponding to the first mode of operation occurring at step (502) of FIG. 5 to another level 603 corresponding to the second mode of operation occurring at step (505) of FIG. 5 with a step input 604. This step input 604 causes the transition from the first mode of operation occurring at step (502) of FIG. 5 to the second mode of operation occurring at step (505) of FIG. 5 to appear instantaneous to a user. Said differently, in one or more embodiments the step input 604 causes the transition from the first mode of operation occurring at step (502) of FIG. 5 to the second mode of operation occurring at step (505) of FIG. 5 to occur substantially instantaneously.

Figure 7:
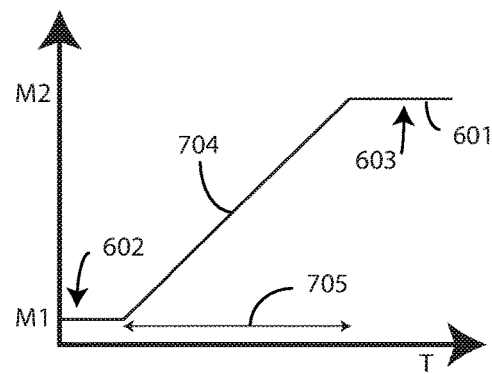
FIG. 7 illustrates another explanatory transition graph for operating modes of a feature of an electronic device in accordance with one or more embodiments of the disclosure.

By contrast, turning now to FIG. 7, in another embodiment the one or more processors (114) of the electronic device (101,102) can cause the control signal 601 driving the device function to transition from the level 602 corresponding to the first mode of operation occurring at step (502) of FIG. 5 to the other level 603 corresponding to the second mode of operation occurring at step (505) of FIG. 5 with an input 704 that varies across a predetermined amount of time 705. This input 704 causes the transition from the first mode of operation occurring at step (502) of FIG. 5 to the second mode of operation occurring at step (505) of FIG. 5 to occur with a more gradual transition depending upon the duration represented by the predetermined amount of time 705. In one or more embodiments, the predetermined amount of time 705 is user-definable using one or more control settings of the electronic device (101,102).

Turning now back to FIG. 5, it should be noted that portions of the method 500 can repeat at step 506 for any desired number of iterations to provide increased granularity and resolution to the mode changing process. For example, using a scale of "one to ten" for differences in mode, in a first iteration of the method 500 step 502 may comprise operating the user interface component of the device function in a first mode of operation in response to a first device function trigger input in a first mode of operation, which is one on the scale of one to ten. In this first iteration of the method 500, step 505 may comprise transitioning operation of the user interface component to a second mode of operation, which is a two on the scale of one to ten, in response to detecting the second device function trigger input occurring while the user interface component is operating in the first mode of operation.

At step 506, the method 500 can include transitioning operation of the user interface component to a third mode of operation, which is a three on the scale of one to ten, in response to detecting a third device function trigger input occurring while the user interface component is operating in the second mode of operation. Thereafter, at step 505, the method 500 can include transitioning operation of the user interface component to a fourth mode of operation, which is a four on the scale of one to ten, in response to detecting a fourth device function trigger input occurring while the user interface component is operating in the third mode of operation, and so forth. In one or more embodiments, this process can repeat until the final mode of operation is reached, i.e., a ten on the scale of one to ten in this example. Alternatively, the method 500 can terminate at step 506 when user input is received terminating the device function.

Figure 8:
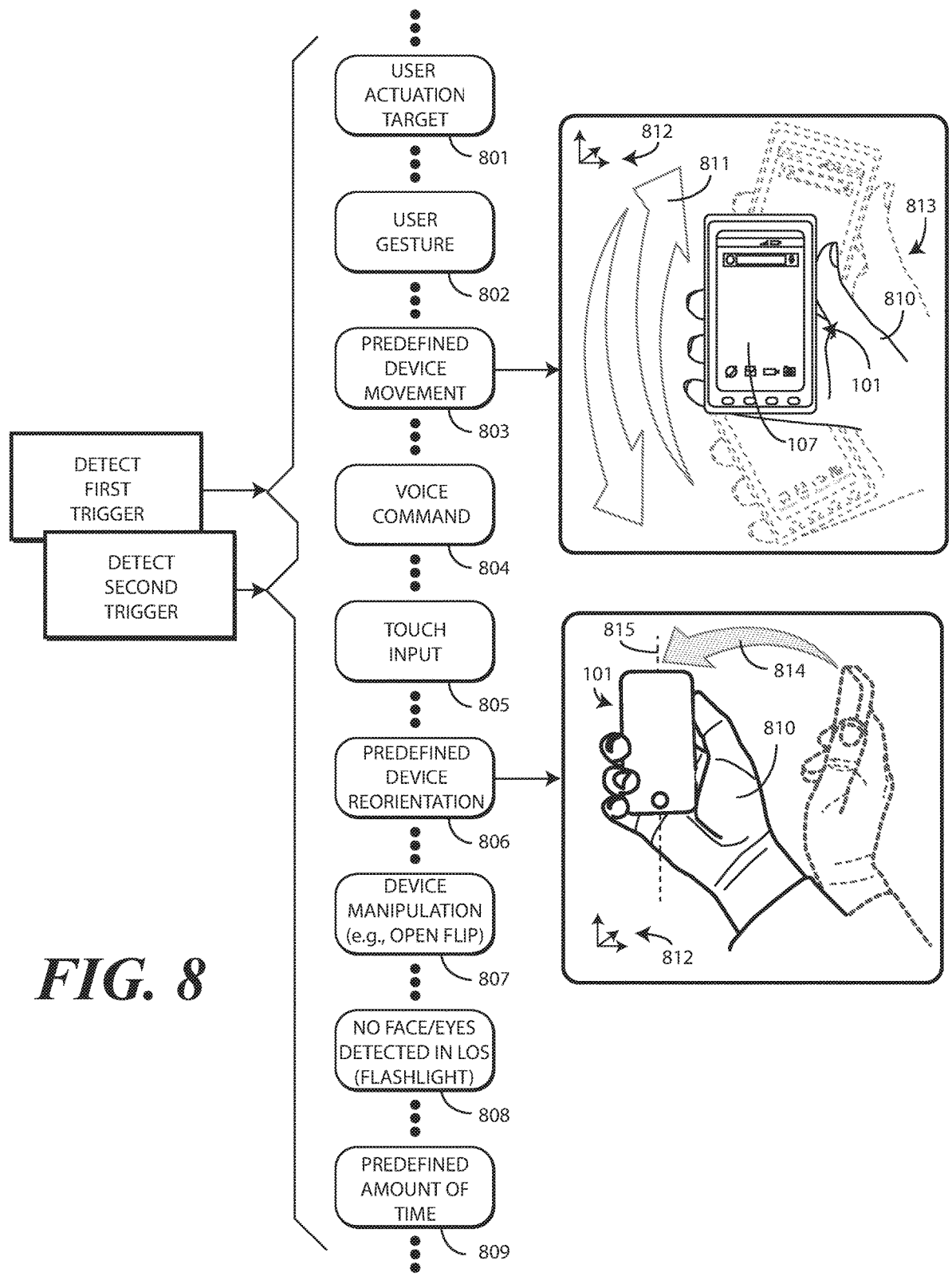
FIG. 8 illustrates a plurality of device function trigger inputs suitable for use as a first device function trigger input, a second device function trigger input, or subsequent device function trigger input in accordance with one or more embodiments of the disclosure.

Turning now to FIG. 8, illustrated therein are various device function trigger inputs that can be used as one or both of the first device function trigger input, the second device function trigger input, and optionally the third or more device function trigger input of FIG. 5. It should be noted that the first device function trigger input and the second device function trigger input (and/or additional device function trigger inputs) can be the same device function trigger input or different device function trigger inputs. For example, where step (502) of FIG. 5 above comprises detecting a "chop chop" motion to actuate and/or operate the device function in the first mode of operation, step (505) could comprise transitioning the user interface component providing the device function from the first mode of operation to the second mode of operation in response to detecting another "chop chop" motion while the user interface component is operating in the first mode of operation.

In other embodiments, however, the first device function trigger input and the second device function trigger input can be different. For instance, where step (502) of FIG. 5 above comprises detecting a "chop chop" motion to actuate and/or operate the device function in the first mode of operation, step (505) could comprise transitioning the user interface component providing the device function from the first mode of operation to the second mode of operation in response to detecting another gesture twisting the electronic device in three-dimensional space while the user interface component is operating in the first mode of operation.

Where three or more device function trigger inputs are employed, they can all be the same, all be different, or may alternate in predefined patterns. For instance, where step (502) of FIG. 5 above comprises detecting a "chop chop" motion to actuate and/or operate the device function in the first mode of operation, and step (505) comprises transitioning the user interface component providing the device function from the first mode of operation to the second mode of operation in response to detecting another gesture twisting the electronic device in three-dimensional space while the user interface component is operating in the first mode of operation, a third device function trigger input detected at step (506) in the form of another "chop chop" may cause the device function to terminate. Alternatively, a third device function trigger input detected at step (506) in the form of moving the electronic device 101,(102) in spinning motion about a minor axis of the electronic device 101,(102) may cause the device function to transition to another mode of operation, and so forth. Thus, it is to be understood that the device function trigger inputs illustrated in FIG. 8 can be used in various combinations. Moreover, the list of device function trigger inputs shown in FIG. 8 is illustrative only, as numerous others will be obvious to those of ordinary skill in the art having the benefit of this disclosure.

A first example of a device function trigger input is user manipulation of a user actuation target 801 at a user interface (112) of an electronic device 101,(102). In one or more embodiments, when a device function becomes active, one or more user actuation targets are presented on a display (107,108) of an electronic device 101,(102) or other touch sensitive surface. In one or more embodiments, a user 810 can deliver touch or other forms of user input to the user actuation target to cause one or both of the one or more processors (114) of the electronic device 101,(102) to actuate and/or operate a user interface to perform a device function in a first mode of operation (where the manipulation of the user actuation target 801 is used as a first device function trigger input) and/or cause the one or more processors (114) of the electronic device 101,(102) to transition operation of the user interface component performing the device function from the first mode of operation to a second (or higher) mode of operation (where the manipulation of the user actuation target 801 is used as a second device function trigger input) upon the one or more sensors (125) of the electronic device 101,(102) detecting the manipulation of the user actuation target 801 while the one or more processors (114) operate the user interface component in the first (or higher) mode of operation.

As described above with reference to FIG. 1, a second example of a device function trigger input is that of a user gesture 802. The user gesture 802 could be a gesture made about the electronic device 101,(102), such as waving a hand above the electronic device 101,(102) as detected by the one or more proximity sensors (124), the imager (121), the depth imager (122), or other sensors (125) in one or more embodiments. The user gesture 802 could comprise moving a hand or other object toward, or away from, the electronic device 101,(102) as detected by the one or more proximity sensors (124), the imager (121), the depth imager (122), or other sensors (125) in one or more embodiments. Other forms of user gestures 802 will be obvious to those of ordinary skill in the art having the benefit of this disclosure.

In other embodiments, the device function trigger input comprises a predefined movement 803 of the electronic device 101,(102) in three-dimensional space 812. In one or more embodiments, one or both of the first device function trigger input or the second device function trigger input comprise gesture inputs translating the electronic device 101,(102) in three-dimensional space 812 in accordance with a predefined movement 803.

For instance, the predefined movement 803 can translate or otherwise move the electronic device 101,(102) in a predefined motion in three-dimensional space 812. Illustrating by example, in one or more embodiments a user 810 can translate 811 the electronic device 101,(102) back and forth in three-dimensional space 812. As shown in this example, the user 810 is translating 811 the electronic device 101,(102) in a chopping motion 813 in three-dimensional space 812. Other predefined movements 803 translating or moving the electronic device 101,(102) in three-dimensional space 812 will be obvious to those of ordinary skill in the art having the benefit of this disclosure.

Another example of a device function trigger input comprises a voice command 804. The user 810 may deliver a voice command 804 such as "turn on flashlight" to cause the one or more processors (114) of the electronic device 101,(102) to actuate and/or operate a user interface to perform a device function in a first mode of operation. Similarly, the user 810 may use another voice command 804 such as "brighten flashlight" or "dim flashlight" to cause the one or more processors (114) of the electronic device 101,(102) to transition operation of the user interface component performing the device function from the first mode of operation to a second (or higher) mode of operation upon the audio input (110) the electronic device 101,(102) detecting this voice command 804 while the one or more processors (114) operate the user interface component in the first (or higher) mode of operation, and so forth. Other examples of voice commands 804 will be obvious to those of ordinary skill in the art having the benefit of this disclosure.

Still another example of a device function trigger input is touch input 805. In one or more embodiments, a user 810 may deliver touch input 805 in the form of a tap, slide, twist, or grasp to cause the one or more processors (114) of the electronic device 101,(102) respond. Illustrating by example, the user 810 may double-tap a touch-sensitive surface or the display (107,(108) of the electronic device 101,(102) to cause the one or more processors (114) of the electronic device 101,(102) to actuate and/or operate a user interface to perform a device function in a first mode of operation. Similarly, the user 810 may slide a finger along the touch-sensitive surface or display 107,(108) to cause the one or more processors (114) of the electronic device 101,(102) to transition operation of the user interface component performing the device function from the first mode of operation to a second (or higher) mode of operation upon the touch-sensitive surface or display 107,(108) of the electronic device 101,(102) while the one or more processors (114) operate the user interface component in the first (or higher) mode of operation, and so forth. Other examples of touch input 805 will be obvious to those of ordinary skill in the art having the benefit of this disclosure.

Yet another example of a device function trigger input comprises a predefined rotation 806 of the electronic device 101,(102). The predefined rotation 806 can comprise a predefined twist, pivot, or other rotation of the electronic device 101,(102). In one or more embodiments, one or both of the first device function trigger input or the second device function trigger input comprise gesture inputs twisting, pivoting, or otherwise rotating the electronic device 101, (102) in three-dimensional space 812 in accordance with a predefined rotation 806.

Illustrating by example, in one or more embodiments the user 810 can twist 814 the electronic device 101,(102) in three-dimensional space about a major axis 815 of the electronic device 101,(102). Other examples of predefined rotations 806 suitable for use as a device function trigger input will be obvious to those of ordinary skill in the art having the benefit of this disclosure.

Still another example of a device function trigger input comprises a device manipulation 807. Recall from above that in one or more embodiments the electronic device (102) can be configured as a deformable electronic device. For example, a hinge (106) can couple a first device housing (104) to a second device housing (105), thereby allowing the first device housing (104) to be selectively pivotable about the hinge (106) relative to the second device housing (105) between a closed position (FIG. 4) and an axially displaced open position (FIG. 1). Alternatively, the electronic device (102) can be bendable, but without a hinge (106), such as when the first device housing (104) and the second device housing (105) are manufactured from bendable materials.

In such embodiments, device manipulation 807, such as pivoting the first device housing (104) relative to the second device housing (105) about the hinge (106) from the closed position to the axially displaced open position can define a device function trigger input. Similarly, pivoting the first device housing (104) relative to the second device housing (105) about the hinge (106) from the axially displaced open position to the closed position can serve as a device function trigger input. Where the electronic device (102) is manufactured from bendable materials, bending or deforming the housing can serve as a device function trigger input.

Thus, to illustrate by example, the user 810 may cause the one or more processors (114) to actuate a user interface component in a first mode of operation by performing the "chop chop" motion 813, but may cause the one or more processors (114) to transition the user interface component performing the device function from the second (or higher) mode of operation by pivoting the first device housing (104) relative to the second device housing (105) about the hinge (106) from the closed position to the axially displaced open position while the one or more processors (114) are operating the user interface component performing the device function in the first mode of operation, and so forth.

Still another example of a device function trigger input is an absence of a face or eyes 808 within a field of view, line of sight, or acoustic output or input cone of a user interface component performing a device function. As noted above, it can be disconcerting for a bright light to suddenly shine in one's eyes out of darkness. Thus, when the device function is a flashlight function, embodiments of the disclosure contemplate that it can be advantageous and desirable to operate the flashlight function at a first, lower brightness level when the field of view or line of sight of the light emitted by a light source (123) is directed a person. However, when the line of sight or field of view is moved away from a person, i.e., when there is an absence of a face or eyes 808 within the line of sight or field of view, as detected by an imager (121) or other sensor (125), this can be used as a device function trigger input to cause the one or more processors (114) of the electronic device 101,(102) to transition the flashlight function from a first, lower brightness to a second, higher brightness. This device function trigger input will be described in more detail below with reference to FIG. 10.

Still another device function trigger input may be expiration of a timer 809. Embodiments of the disclosure contemplate that the "don't shine the light in my eyes" problem described in the preceding paragraph can be solved in multiple ways. Thus, in another embodiment, the one or more processors (114) operating the user interface component in the first mode of operation in response to a first device function trigger input transition operation of the user interface component from the first mode of operation to the second mode of operation after a predetermined amount of time operating the user interface component in the first mode of operation, i.e., after the expiration of a timer 809. A user might cause a flashlight function, for example, to actuate using the "chop chop" motion 813, with the light source (123) of the electronic device 101,(102) operating at a first, lower brightness until expiration of a timer 809, in which the one or more processors (114) transition the light source (123) to a second (or higher) mode of operation by causing it to emit light with a second, higher brightness. This transition can occur instantaneously (FIG. 6) or gradually (FIG. 7). In one or more embodiments, the amount of time that lapses prior to the transition from the first mode of operation to the second mode of operation is user-definable using a settings menu in the electronic device 101,(102).

Figure 9:
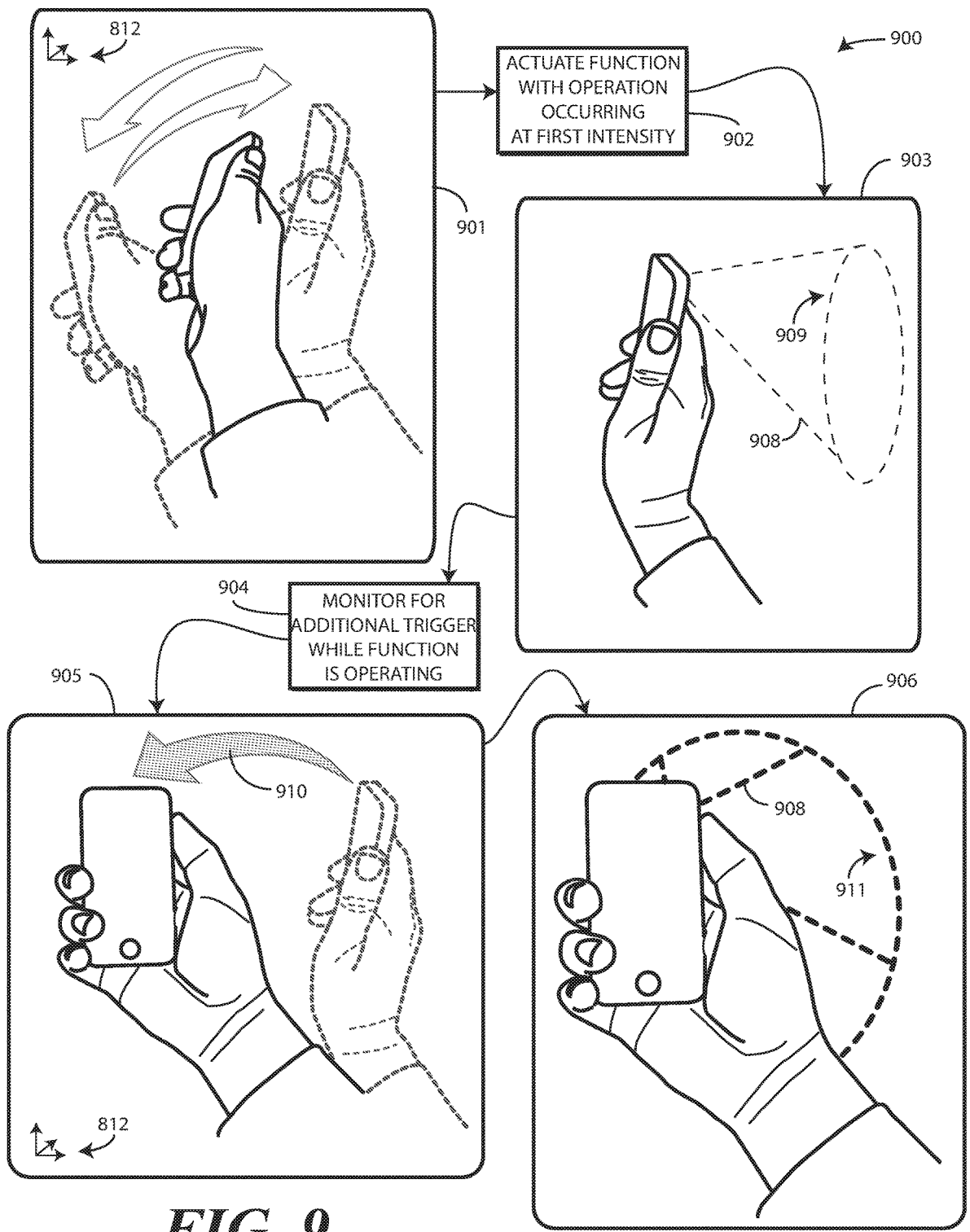
FIG. 9 illustrates one explanatory method in accordance with one or more embodiments of the disclosure.

Turning now to FIG. 9, illustrated therein is a method 900 of using one or more of the device function trigger inputs described above with reference to FIG. 8 in accordance with one or more embodiments of the disclosure. In the example illustrated in FIG. 9, the user interface component is a light source (123) configured as a light output (302) situated on a housing 103 of the electronic device 101. In the example illustrated in FIG. 9, the device function is that of a flashlight function. In the method 900 of FIG. 9, two illustrative device function trigger inputs have been selected from FIG. 8, namely, the predefined device movement (803) and the predefined device rotation (806). These are explanatory only. As noted above, any of the trigger inputs described above with reference to FIG. 8 could be used alone or in combination.

At step 901, one or more sensors (125) of an electronic device 101 detect a major axis (815) of the electronic device 101 moving in a chopping motion 907 in three-dimensional space 812. At step 902, one or more processors (114) of the electronic device 101 operable with the one or more sensors (125) cause a light output (302) to emit light with a first luminous intensity. As shown at step 903, this results in the light output (302) emitting light 908 with a first brightness level 909.

At step 904, the one or more processors monitor for another device function trigger input while the light output (302) is operating in the first mode of operation shown at step 903. At step 905, the one or more processors (114) detect, using the one or more sensors (125) of the electronic device 101, the electronic device 101 twisting 910 along the major axis (815) in the three-dimensional space 812 while the light output (302) is emitting the light 908 with the first luminous intensity.

At step 906, in response to the one or more sensors (125) detecting the electronic device 101 twisting 910 along the major axis (815) at step 905, the one or more processors (114) cause the light output (302) to emit the light 908 with a second luminous intensity that is different from the first luminous intensity of step 903. In this example, the second luminous intensity is greater than the first luminous intensity. This results in the second brightness level 911 of step 906 being brighter than the first brightness level 909 of step 903.

It should be noted that the transition between the first brightness level 909 of step 903 to the second brightness level 911 of step 906 in response to detecting the second device function trigger input at step 905 while the device function was operating in the first mode of operation can occur instantaneously (FIG. 6) in response to a step input (604) or gradually (FIG. 7) across a predefined amount of time (705). As described above with reference to FIG. 7, in one or more embodiments the one or more processors (114) cause the light output (302) to transition between the first luminous intensity of step 903 to the second luminous intensity at step 906 across a predefined amount of time (705) in response to the one or more sensors (125) detecting the electronic device 101 twisting along the major axis (815) at step 905.

Figure 10:
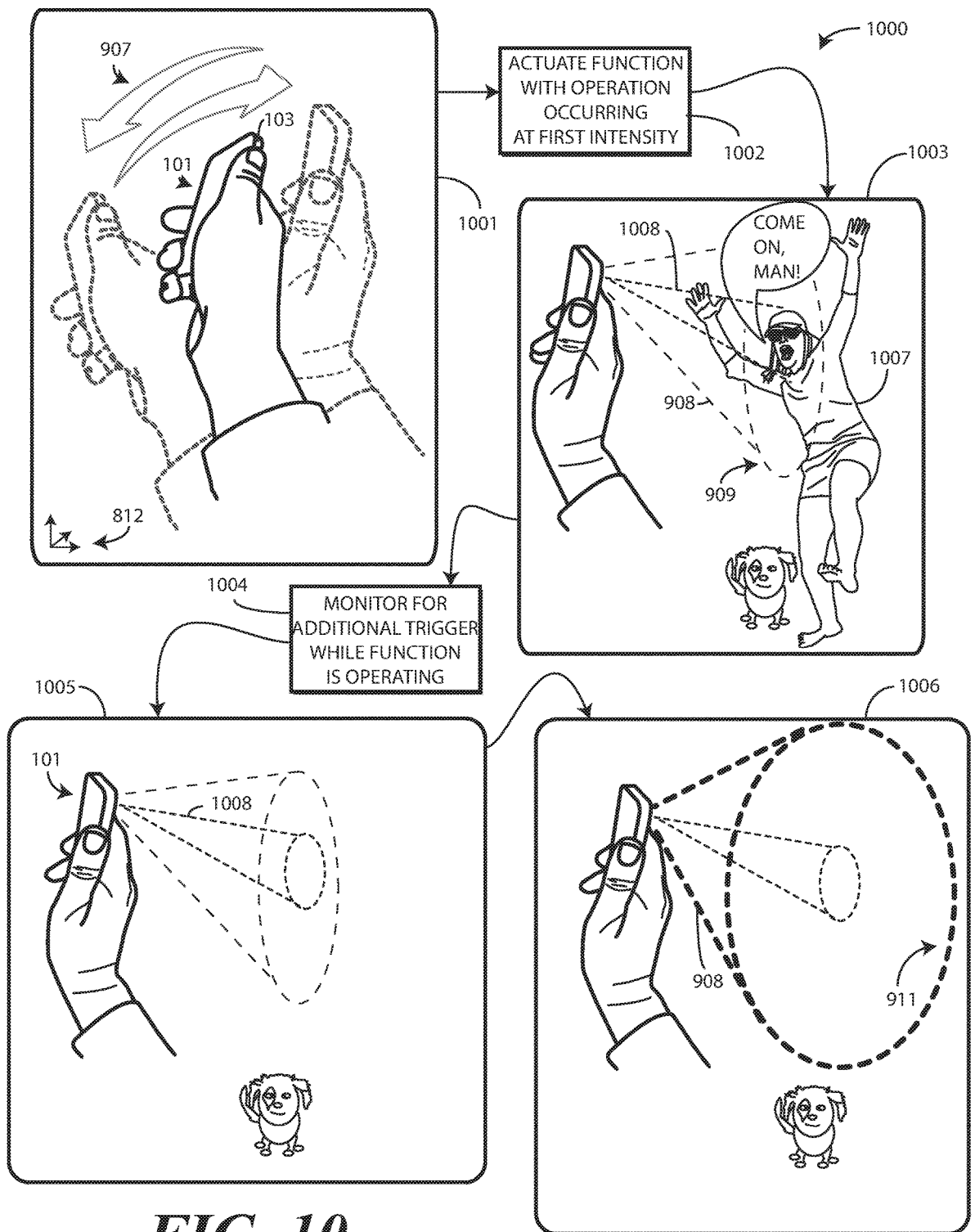
FIG. 10 illustrates another explanatory method in accordance with one or more embodiments of the disclosure.

Turning now to FIG. 10, illustrated therein is another method 1000 of using one or more of the trigger inputs described above with reference to FIG. 8 in accordance with one or more embodiments of the disclosure. As was the case with FIG. 9, in this example the user interface component is again a light source (123) configured as a light output (302) situated on a housing 103 of the electronic device 101. In this explanatory embodiment, the device function is again that of a flashlight function. (Other examples of device functions will be described below with reference to FIGS. 11-14.) In the method 1000 of FIG. 10, two illustrative device function trigger inputs have been selected from FIG. 8, namely, the predefined device movement (803) and the absence of a face or eyes (808) within a field of view of the light being emitted by the light output (302).

At step 1001, one or more sensors (125) of the electronic device 101 detect a major axis (815) of the electronic device 101 moving in a chopping motion 907 in three-dimensional space 812. At step 1002, one or more processors (114) of the electronic device 101 operable with the one or more sensors (125) cause the light output (302) to emit light with a first luminous intensity, which results in the light having first brightness level. As shown at step 1003, this results in the light output (302) emitting light 908 with a first brightness level 909.

Unfortunately, as shown at step 1003, the light 908 happens to be shining right in the eyes of a third party 1007. Had the light output (302) come on at full intensity, this may have been really annoying to the third party 1007. However, since the electronic device 101 is configured in accordance with embodiments of the disclosure, the one or more processors (114) operate the light output (302) in a first mode of operation at step 1003, which in this example is a low brightness level 909. Accordingly, while the field of view 1008 of the light 908 is directed at the third party 1007, she is not blinded or shocked since the light is at a relatively low brightness level.

At step 1004, the one or more processors monitor for another device function trigger input while the light output (302) is operating in the first mode of operation shown at step 1003. In this illustrative example, step 1004 comprises the one or more processors (114) monitoring, with an imager (121) operable with the one or more processors (114), at least a portion of the field of view 1008 of the light 908 emitted by the flashlight function. This monitoring occurs at step 1004 because in this illustrative example the second device function trigger input comprises an absence of a face or eyes (808) within a field of view 1008 of the light 908 being emitted by the light output (302), i.e., the trigger is an absence of a person (third party 1007) within the field of view 1008 of the light 908 emitted by the flashlight function.

At step 1005, the one or more processors (114) detect that the third party 1007 has left the environment of the electronic device 101. Thus, the third party 1007 is no longer within the field of view 1008 of the light 908 being emitted by the light output (302).

At step 1006, in response to the one or more processors (114) detecting the absence of a person's face detected by the one or more sensors (125) within projected light, e.g., field of view 1008, of the light 908 at step 1005, the one or more processors (114) cause the light output (302) to emit the light 908 with a second luminous intensity that is different from the first luminous intensity of step 1003. In this example, the second luminous intensity is greater than the first luminous intensity. This results in the second brightness level 911 of step 1006 being brighter than the first brightness level 909 of step 1003.

Thus, using the method 1000 of FIG. 10, a person can actuate the flashlight function at a first, lower luminous intensity by making a gesture that moves the device in a chopping motion in three-dimensional space, but can advantageously transition the light output of the flashlight function to a second, higher luminous intensity by making another gesture twisting the electronic device about an axis in three-dimensional space. If the light of the flashlight function were inadvertently aimed at a person when the authorized user of the electronic device launched the flashlight function with the "chop-chop" motion, they would not be surprised or annoyed due to the fact that the light was being emitted at a low, comfortable level. However, when the authorized user of the electronic device twists the light output of the flashlight function toward a target object, in one or more embodiments the one or more processors transition the light output from the first, lower level of luminous intensity to a second, higher luminous intensity. Advantageously, embodiments of the disclosure provide a quick, easy, and intuitive way to transition features or functions of an electronic device between different modes of operation.

To this point, for explanatory and illustrative purposes, a flashlight function has been used to illustrate and describe embodiments of the disclosure due to the fact that it is a simple device function well suited for illustration. However, it is to be understood that a flashlight function is but one device function suitable for use with methods, systems, and electronic devices configured in accordance with embodiments of the disclosure. Turning now to FIGS. 11-14, illustrated therein are various other modes of operation that can be adjusted using methods and systems described herein, both with the flashlight function and with other device functions. Other examples of device functions and modes of operation associated therewith will be obvious to those of ordinary skill in the art having the benefit of this disclosure.

Figure 11:
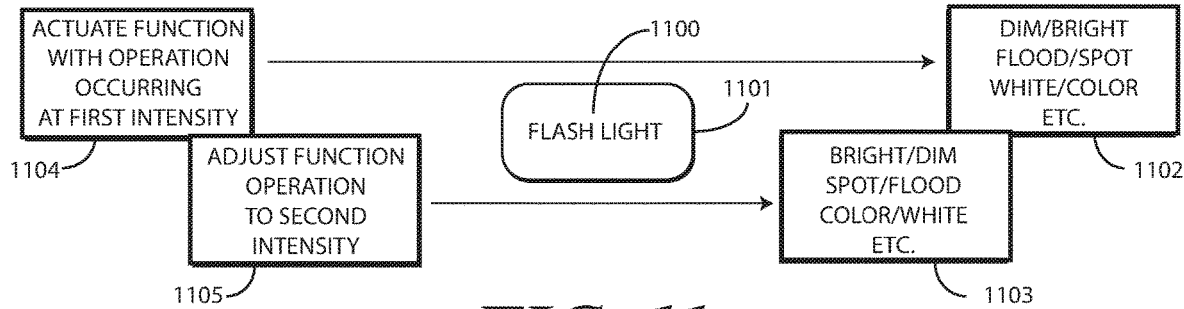
FIG. 11 illustrates explanatory modes of operation for one explanatory electronic device feature in accordance with one or more embodiments of the disclosure.

Beginning with FIG. 11, in one or more embodiments the user interface component 1100 performing the device function 1101 is a light source situated along a housing of an electronic device capable of performing a flashlight function. The flashlight function is capable of operating in at least a first mode of operation 1102 and a second mode of operation 1103. For example, in one or more embodiments one or more processors are operable at 1104 to actuate and operate the device function 1101 in a first mode of operation 1104 upon detecting a first trigger input. Similarly, the one or more processors are operable to transition the device function 1101 from the first mode of operation 1102 to the second mode of operation 1103 in response to detecting a second trigger input occurring while the device function 1101 is operating in the first mode of operation 1102.

In the illustrative examples previously described, the first mode of operation 1102 has been a first luminous intensity or brightness level, while the second mode of operation 1103 has been a second luminous intensity or brightness level. The first luminous intensity or brightness level could be greater than, i.e., brighter, than the second luminous intensity or brightness level in one or more embodiments. Alternatively, first luminous intensity or brightness level could be less than, i.e., dimmer, than the second luminous intensity or brightness level. A user can transition between the first mode of operation 1102 and the second mode of operation 1103 by delivering the second trigger or second device function trigger input while the device function 1101 is operating in the first mode of operation 1102.

However, transitioning between a bright and dim light or vice versa is but one example of a first mode of operation 1102 and a second mode of operation 1103 in accordance with embodiments of the disclosure. In another embodiment, the first mode of operation 1102 may comprise a spotlight, while the second mode of operation 1103 comprises a flood light, or vice versa. Similarly, the first mode of operation 1102 may emit a light that is colored, while the second mode of operation 1103 emits a light that is white, or vice versa. Other modes of operation suitable for transitioning between in a flashlight mode will be obvious to those of ordinary skill in the art having the benefit of this disclosure.

Figure 12:
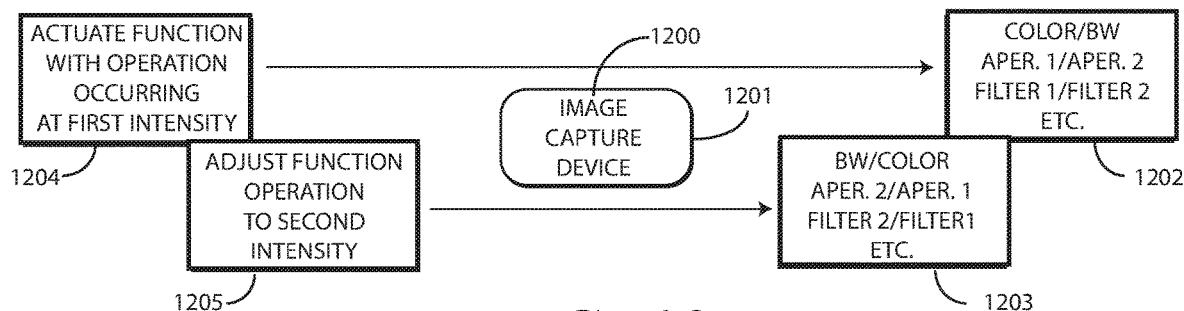
FIG. 12 illustrates other explanatory modes of operation for another explanatory electronic device feature in accordance with one or more embodiments of the disclosure.

Turning now to FIG. 12, in another embodiment the user interface component 1200 performing the device function 1201 is an image capture device. The image capture function is capable of operating in at least a first mode of operation 1202 and a second mode of operation 1203. For example, in one or more embodiments one or more processors are operable at 1204 to actuate and operate the device function 1201 in a first mode of operation 1204 upon detecting a first trigger input. Similarly, the one or more processors are operable to transition the device function 1201 from the first mode of operation 1202 to the second mode of operation 1203 in response to detecting a second trigger input occurring while the device function 1201 is operating in the first mode of operation 1202.

In one or more embodiments, the first mode of operation 1202 causes the image capture device to capture color images, while the second mode of operation 1203 causes the image capture device to capture grey scale or black and white images. A user can transition between the first mode of operation 1202 and the second mode of operation 1203 by delivering the second trigger or second device function trigger input while the device function 1201 is operating in the first mode of operation 1202.

However, transitioning between color images or black and white images, or vice versa, is but one example of a first mode of operation 1202 and a second mode of operation 1203 in accordance with embodiments of the disclosure. In another embodiment, the first mode of operation 1202 may comprise the image capture device capturing images with a first aperture or shutter setting, while the second mode of operation 1203 may comprise the image capture device capturing images with a second aperture or shutter setting, or vice versa. Similarly, the first mode of operation 1202 may invoke a first filter, while the second mode of operation 1203 invokes a second filter, or vice versa. Other modes of operation suitable for transitioning between in a flashlight mode will be obvious to those of ordinary skill in the art having the benefit of this disclosure.

Figure 13:
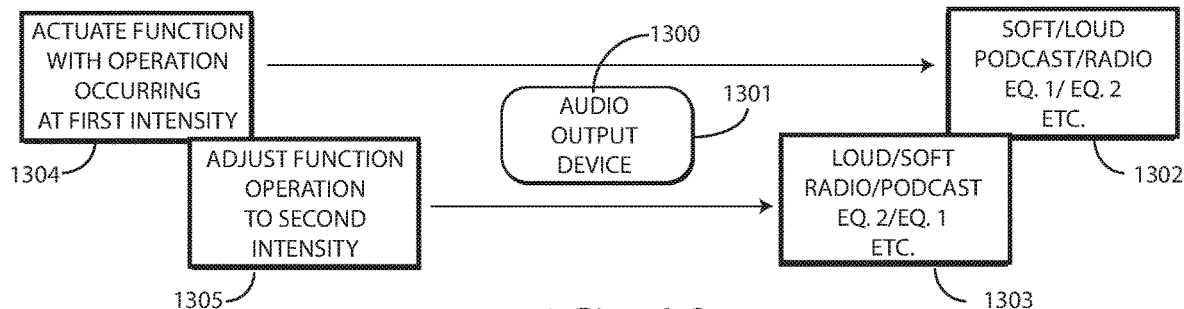
FIG. 13 illustrates still other explanatory modes of operation for still another explanatory electronic device feature in accordance with one or more embodiments of the disclosure.

Turning now to FIG. 13, in another embodiment the user interface component 1300 performing the device function 1301 is an audio output device. The audio output function is capable of operating in at least a first mode of operation 1302 and a second mode of operation 1303. For example, in one or more embodiments one or more processors are operable at 1304 to actuate and operate the device function 1301 in a first mode of operation 1304 upon detecting a first trigger input. Similarly, the one or more processors are operable to transition the device function 1301 from the first mode of operation 1302 to the second mode of operation 1303 in response to detecting a second trigger input occurring while the device function 1301 is operating in the first mode of operation 1302.

In one or more embodiments, the first mode of operation 1302 causes the audio output device to deliver audio at a first, lower volume, while the second mode of operation 1303 causes the audio output device to output audio at a second, louder volume. A user can transition between the first mode of operation 1302 and the second mode of operation 1303 by delivering the second trigger or second device function trigger input while the device function 1301 is operating in the first mode of operation 1302.

However, transitioning between a softer and louder audio, or vice versa, is but one example of a first mode of operation 1302 and a second mode of operation 1303 in accordance with embodiments of the disclosure. In another embodiment, the first mode of operation 1302 may comprise the audio output device delivering output from a first source, such as a streaming radio service, while the second mode of operation 1303 may comprise the audio capture device delivering output from a second source, such as a podcast, or vice versa. Similarly, the first mode of operation 1302 may invoke a equalizer setting, while the second mode of operation 1303 invokes a equalizer setting, or vice versa. Other modes of operation suitable for transitioning between in a flashlight mode will be obvious to those of ordinary skill in the art having the benefit of this disclosure.

Figure 14:
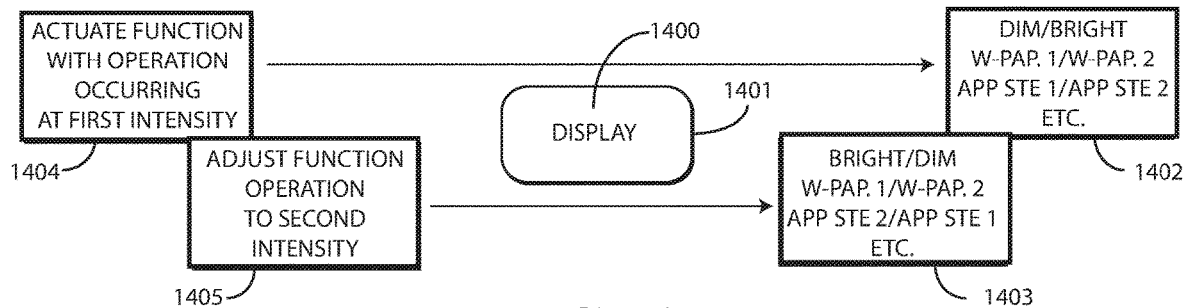
FIG. 14 illustrates still more explanatory modes of operation for another explanatory electronic device feature in accordance with one or more embodiments of the disclosure.

Turning now to FIG. 14, in another embodiment the user interface component 1400 performing the device function 1401 is a display. The display function is capable of operating in at least a first mode of operation 1402 and a second mode of operation 1403. For example, in one or more embodiments one or more processors are operable at 1404 to actuate and operate the device function 1401 in a first mode of operation 1404 upon detecting a first trigger input. Similarly, the one or more processors are operable to transition the device function 1401 from the first mode of operation 1402 to the second mode of operation 1403 in response to detecting a second trigger input occurring while the device function 1401 is operating in the first mode of operation 1402.

In one or more embodiments, the first mode of operation 1402 causes the display to operate at a first, lower brightness level, while the second mode of operation 1403 causes the display to operate at a second, brighter brightness level. A user can transition between the first mode of operation 1402 and the second mode of operation 1403 by delivering the second trigger or second device function trigger input while the device function 1401 is operating in the first mode of operation 1402.

However, transitioning between brighter and dimmer display levels, or vice versa, is but one example of a first mode of operation 1402 and a second mode of operation 1403 in accordance with embodiments of the disclosure. In another embodiment, the first mode of operation 1402 may comprise the display presenting a first wallpaper image, while the second mode of operation 1403 may comprise the display presenting a second wallpaper image, or vice versa. Similarly, the first mode of operation 1402 may cause the display to present a first application suite, while the second mode of operation 1403 causes the display to present a second application suite, or vice versa. Other modes of operation suitable for transitioning between in a flashlight mode will be obvious to those of ordinary skill in the art having the benefit of this disclosure.

It should be noted that the user interface components, device functions, and modes of operation illustrated in FIGS. 11-14 are illustrative only. Numerous other device functions could be employed using the trigger-based switching technique described herein. For example, the methods and systems described herein could be used to transition from a handset mode to a speaker mode, from metric to English units, from a Wi-Fi connection to a cellular connection, and so forth. Numerous other examples of user interface components, device functions, and modes of operation suitable for use with the methods and systems described herein will be obvious to those of ordinary skill in the art having the benefit of this disclosure.

Figure 15:
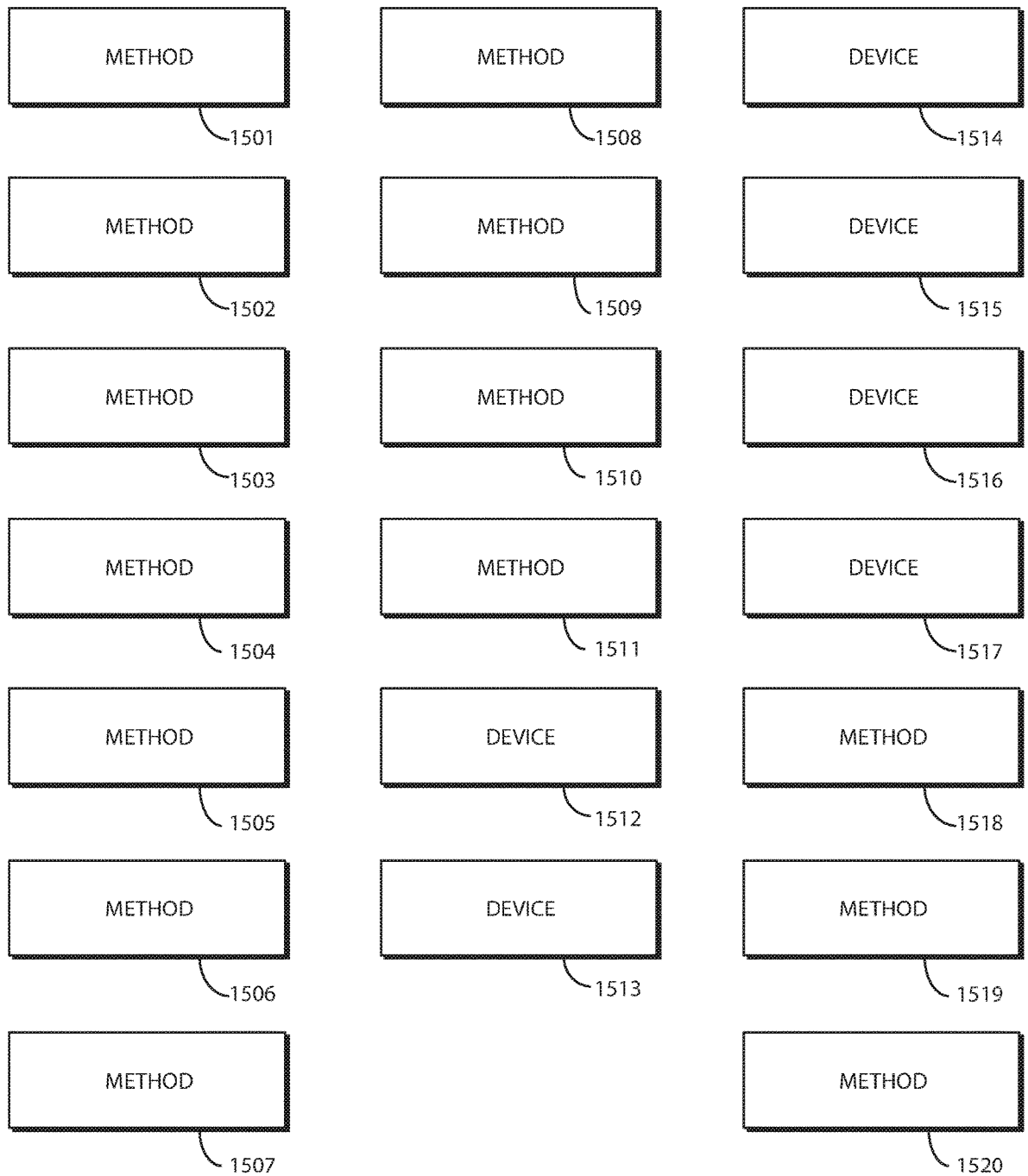
FIG. 15 illustrates one or more embodiments of the disclosure.

Turning now to FIG. 15, illustrated therein are various embodiments of the disclosure. At 1501, a method in an electronic device comprises detecting, with one or more sensors of the electronic device, a first device function trigger input requesting performance of a device function. At 1501, the method comprises operating, by one or more processors operable with the one or more sensors, the device function in a first mode of operation in response to the first device function trigger input.

At 1501, the method comprises detecting, with the one or more sensors, a second device function trigger input while the device function is operating in the first mode of operation. At 1501, in response to the detecting the second device function trigger input, the method comprises operating, by the one or more processors, the device function in a second mode of operation that is different from the first mode of operation.

At 1502, the device function of 1501 comprises a flashlight function emitting light when the flashlight function is operating. At 1502, the first mode of operation of 1502 comprises the flashlight function emitting the light with a first luminous intensity. At 1504, the second mode of operation of 1503 comprises the flashlight function emitting the light with a second luminous intensity.

At 1505, the first luminous intensity of 1504 is less than the second luminous intensity. At 1506, the first device function trigger input of 1504 comprises a gesture input translating the electronic device back and forth in three-dimensional space.

At 1507, the gesture input of 1506 translates the electronic device in a chopping motion in the three-dimensional space. At 1508, the second device function trigger input of 1506 comprises another gesture input twisting the electronic device in the three-dimensional space. At 1509, the second luminous intensity of 1508 comprises a maximum luminous intensity of the flashlight function.

At 1510, the method of 1506 further comprises monitoring, with an imager operable with the one or more processors, at least a portion of a field of view of the light emitted by the flashlight function. At 1510, the second device function trigger input comprises an absence of a person within the field of view of the light emitted by the flashlight function. At 1511, the first device function trigger input and the second device function trigger input of 1501 are different.

At 1512, an electronic device comprises one or more sensors. At 1512, the electronic device comprises one or more processors operable with the one or more sensors. At 1512, the electronic device comprises a user interface component operable with the one or more processors in at least a first mode of operation and a second mode of operation that is different from the first mode of operation.

At 1512, the one or more processors operate the user interface component in the first mode of operation in response to a first trigger input. At 1512, the one or more processors transition operation of the user interface component from the first mode of operation to the second mode of operation upon the one or more sensors detecting a second trigger input occurring while the one or more processors operate the user interface component in the first mode of operation.

At 1513, the first trigger input of 1512 is different from the second trigger input. AT 1514, one or both of the first trigger input or the second trigger input of 1513 comprise gesture inputs translating the electronic device in three-dimensional space.

At 1515, the user interface component of 1513 comprises a light situated on a housing of the electronic device. At 1516, the first mode of operation of 1515 comprises the light operating at a first brightness level, while the second mode of operation comprises the light operating at a second brightness level that is greater than the first brightness level. At 1517, the second trigger input of 1516 comprises an absence of a person's face detected by the one or more sensors within projected light of the light.

At 1518, a method in an electronic device comprises detecting, with one or more sensors of the electronic device, a major axis of the electronic device moving in a chopping motion in three-dimensional space. At 1518, the method comprises causing, by one or more processors operable with the one or more sensors, a light output of the electronic device to emit light with a first luminous intensity.

At 1518, the method comprises detecting, by the one or more sensors, the electronic device twisting along the major axis in the three-dimensional space while the light output is emitting the light with the first luminous intensity. At 1518, the method comprises, in response to the one or more sensors detecting the electronic device twisting along the major axis, causing, by the one or more processors, the light output to emit the light with a second luminous intensity that is different from the first luminous intensity.

At 1519, the second luminous intensity of 1518 is greater than the first luminous intensity. At 1520, the one or more processors of 1519 cause the light output to transition between the first luminous intensity to the second luminous intensity across a predefined amount of time in response to the one or more sensors detecting the electronic device twisting along the major axis.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
   detecting, with one or more sensors of the electronic device, a first device function trigger input requesting performance of a device function, the first device function trigger input comprising a gesture input translating the electronic device back and forth in three-dimensional space;
   operating, by one or more processors operable with the one or more sensors, the device function in a first mode of operation in response to the first device function trigger input, the device function comprising a flashlight function emitting light with a first luminous intensity when the flashlight function is operating;
   detecting, with the one or more sensors, a second device function trigger input while the device function is operating in the first mode of operation, the second device function trigger input comprising another gesture input twisting the electronic device in the three-dimensional space; and
   in response to the detecting the second device function trigger input, operating, by the one or more processors, the device function in a second mode of operation that is different from the first mode of operation, the second mode of operation comprising the flashlight function emitting the light with a second luminous intensity, wherein the one or more processors cause the device function to transition from the first mode of operation to the second mode of operation by causing a control signal driving a light source to transition from a first level causing the first mode of operation to a second level causing the second mode of operation across a predetermined amount of time;
   wherein the first luminous intensity is less than the second luminous intensity.

2. The method of claim 1, wherein the light source functions as a flash for an image capture device when operating in a mode of operation other than the first mode of operation or the second mode of operation.

3. The method of claim 1, the first mode of operation comprising the flashlight function emitting the light with a minimum luminous intensity of the light source.

4. The method of claim 3, the second mode of operation comprising the flashlight function emitting the light with a maximum luminous intensity of the light source.

5. The method of claim 4, wherein the light source comprises a display of the electronic device.

6. The method of claim 1, wherein the light with the first luminous intensity has a first color associated therewith and the light with the second luminous intensity has a second color associated therewith, wherein the first color and the second color are different.

7. The method of claim 1, the gesture input translating the electronic device in a chopping motion in the three-dimensional space.

8. The method of claim 1, the another gesture input twisting the electronic device around a major axis of the electronic device in the three-dimensional space.

9. The method of claim 8, the second luminous intensity comprising a maximum luminous intensity of the flashlight function.

10. The method of claim 1, further comprising monitoring, with an imager operable with the one or more processors, at least a portion of a field of view of the light emitted by the flashlight function, the second device function trigger input comprising an absence of a person within the field of view of the light emitted by the flashlight function.

11. The method of claim 1, wherein the first mode of operation and the second mode of operation comprise iterative modes of operation selected from a series of iterative modes of operation each increasing a luminous intensity of the flashlight function over a previous iterative mode of operation of the series of iterative modes of operation.

12. An electronic device, comprising:
    one or more sensors;
    one or more processors operable with the one or more sensors; and
    a user interface component operable with the one or more processors in at least a first mode of operation and a second mode of operation that is different from the first mode of operation; and
    the one or more processors operating the user interface component in the first mode of operation in response to a first trigger input and transitioning operation of the user interface component from the first mode of operation to the second mode of operation upon the one or more sensors detecting a second trigger input occurring while the one or more processors operate the user interface component in the first mode of operation, the one or more processors causing the user interface component to transition from the first mode of operation to the second mode of operation by causing a control signal driving the user interface component to transition from a first level causing the first mode of operation to a second level causing the second mode of operation across a predetermined amount of time;

wherein one or both of the first trigger input or the second trigger input comprise gesture inputs translating the electronic device in three-dimensional space.

13. The electronic device of claim 12, wherein the first trigger input is different from the second trigger input.

14. The electronic device of claim 13, wherein one or both of the first trigger input or the second trigger input comprise a chopping motion moving the electronic device up and down in a chop motion.

15. The electronic device of claim 13, the user interface component comprising a light situated on a housing of the electronic device.

16. The electronic device of claim 15, the first mode of operation comprising the light operating at a first brightness level, the second mode of operation comprising the light operating at a second brightness level that is greater than the first brightness level.

17. The electronic device of claim 16, the second trigger input comprising an absence of a person's face detected by the one or more sensors within projected light of the light.

18. A method in an electronic device, the method comprising:

detecting, with one or more sensors of the electronic device, a major axis of the electronic device moving in a chopping motion in three-dimensional space;

causing, by one or more processors operable with the one or more sensors, a light output of the electronic device to emit light with a first luminous intensity;

detecting, by the one or more sensors, the electronic device twisting along the major axis in the three-dimensional space while the light output is emitting the light with the first luminous intensity; and in response to the one or more sensors detecting the electronic device twisting along the major axis, causing, by the one or more processors, the light output to emit the light with a second luminous intensity that is different from the first luminous intensity;

wherein the one or more processors cause a transition from causing the light output to emit the light with the first luminous intensity to emitting the light with the second luminous intensity by causing a control signal driving the light output to transition from a first level causing the first luminous intensity to a second level causing the second luminous intensity across a predetermined amount of time.

19. The method of claim 18, wherein the second luminous intensity is greater than the first luminous intensity.

20. The method of claim 19, the one or more processors causing the light output to transition between the first luminous intensity to the second luminous intensity across a predefined amount of time in response to the one or more sensors detecting the electronic device twisting along the major axis.

* * * * *